(12) United States Patent
Johnson et al.

(10) Patent No.: US 8,656,058 B2
(45) Date of Patent: *Feb. 18, 2014

(54) BACK-OFF RETRY WITH PRIORITY ROUTING

(75) Inventors: Stephen B. Johnson, Colorado Springs, CO (US); Christopher McCarty, Colorado Springs, CO (US); Wiliam Petty, Colorado Springs, CO (US); Jeffrey J. Gauvin, Manitou Springs, CO (US)

(73) Assignee: LSI Corporation, San Jose, CA (US)

( * ) Notice: Subject to any disclaimer, the term of this patent is extended or adjusted under 35 U.S.C. 154(b) by 0 days.
This patent is subject to a terminal disclaimer.

(21) Appl. No.: 13/008,706

(22) Filed: Jan. 18, 2011

(65) Prior Publication Data

US 2011/0113176 A1 May 12, 2011

Related U.S. Application Data

(63) Continuation-in-part of application No. 12/384,291, filed on Apr. 2, 2009, now Pat. No. 8,077,605, and a continuation-in-part of application No. 12/384,287, filed on Apr. 2, 2009, now Pat. No. 7,913,023, and a continuation-in-part of application No. 12/384,288, filed on Apr. 2, 2009, now Pat. No. 8,321,596, and a continuation-in-part of application No. 12/791,244, filed on Jun. 1, 2010, now Pat. No. 8,244,948, which is a continuation-in-part of application No. 12/384,289, filed on Apr. 2, 2009, now Pat. No. 7,849,248.

(60) Provisional application No. 61/191,037, filed on Sep. 5, 2008.

(51) Int. Cl.
G06F 3/00 (2006.01)
G06F 5/00 (2006.01)

(52) U.S. Cl.
USPC ............ 710/2; 710/1; 710/5; 710/20; 710/36; 710/48; 710/58

(58) Field of Classification Search
USPC .................................. 710/2, 5, 20, 36, 48, 58
See application file for complete search history.

(56) References Cited

U.S. PATENT DOCUMENTS 6,598,106 B1 7/2003 Greishaber et al.
7,035,952 B2 * 4/2006 Elliott et al. .................. 710/300

(Continued)

FOREIGN PATENT DOCUMENTS

EP 1796003 A2 6/2007
JP 2006072636 A 3/2006

(Continued)

OTHER PUBLICATIONS

Czekalski, Marty, "Serial Attached SCSI Architecture", May 20, 2003, SCSI Trade Association, retrieved from the Internet at http://scsita.org/aboutscsi/sas/SAS_Architecture_Overview.pdf, pp. 1-13.

(Continued)

Primary Examiner — Idriss N Alrobaye
Assistant Examiner — Gentente A Yimer
(74) Attorney, Agent, or Firm — Suiter Swantz pc llo

(57) ABSTRACT

A method for back-off retry with priority routing in a single, cohesive SAS expander includes routing a data transfer between an input of a single, cohesive SAS expander and an output of the single, cohesive SAS expander, wherein the single, cohesive expander includes a first SAS expander, and at least one additional SAS expander via at least one inter-expander link (IEL). The routing of data may further include routing a first OPEN request on a direct path through the first SAS expander to a port of a device and routing a second OPEN request on an alternate path from the first SAS expander and through a second SAS expander to the port of the device. The method further includes determining link availability between the second SAS expander and the port of the device, and, upon determination of a failed link or a busy link, re-routing the data transfer from the second SAS expander to the first SAS expander or a third SAS expander, or retrying the data transfer through the second SAS expander.

21 Claims, 18 Drawing Sheets

(56) References Cited

U.S. PATENT DOCUMENTS

| | | | |
|---|---|---|---|
| 7,171,500 B2* | 1/2007 | Day et al. | 710/106 |
| 7,337,234 B2* | 2/2008 | Hu et al. | 709/239 |
| 7,363,382 B1* | 4/2008 | Bakke et al. | 709/230 |
| 7,437,462 B2* | 10/2008 | Marks et al. | 709/226 |
| 7,529,877 B2* | 5/2009 | Bashford et al. | 710/314 |
| 7,536,584 B2 | 5/2009 | Davies et al. | |
| 7,584,319 B1* | 9/2009 | Liao et al. | 710/317 |
| 7,644,168 B2* | 1/2010 | Grieff et al. | 709/229 |
| 7,668,925 B1 | 2/2010 | Liao et al. | |
| 7,707,338 B1 | 4/2010 | Walch et al. | |
| 7,721,021 B2* | 5/2010 | Johnson | 710/36 |
| 7,730,252 B2 | 6/2010 | Odenwald et al. | |
| 7,913,023 B2* | 3/2011 | Johnson et al. | 710/307 |
| 8,077,605 B2* | 12/2011 | McCarty et al. | 370/225 |
| 8,321,596 B2* | 11/2012 | Johnson et al. | 710/2 |
| 2005/0071532 A1 | 3/2005 | Bakke et al. | |
| 2005/0108452 A1 | 5/2005 | Loffink | |
| 2005/0138221 A1 | 6/2005 | Marushak | |
| 2005/0193178 A1 | 9/2005 | Voorhees et al. | |
| 2006/0031612 A1 | 2/2006 | Bashford et al. | |
| 2006/0101171 A1 | 5/2006 | Grieff et al. | |
| 2006/0194386 A1 | 8/2006 | Yao et al. | |
| 2006/0230125 A1 | 10/2006 | Johnson | |
| 2007/0005862 A1 | 1/2007 | Seto | |
| 2007/0028062 A1 | 2/2007 | Radhakrishnan et al. | |
| 2007/0070885 A1 | 3/2007 | Uddenberg et al. | |
| 2007/0088917 A1 | 4/2007 | Ranaweera et al. | |
| 2007/0088978 A1 | 4/2007 | Lucas et al. | |
| 2007/0101018 A1* | 5/2007 | Shirazipour et al. | 709/238 |
| 2007/0165660 A1 | 7/2007 | Fang et al. | |
| 2007/0183404 A1* | 8/2007 | Hofer | 370/352 |
| 2007/0198761 A1 | 8/2007 | Duerk et al. | |
| 2007/0220204 A1 | 9/2007 | Nakajima et al. | |
| 2007/0276981 A1 | 11/2007 | Atherton et al. | |
| 2007/0294572 A1 | 12/2007 | Kalwitz et al. | |
| 2008/0104264 A1 | 5/2008 | Duerk et al. | |
| 2008/0120687 A1 | 5/2008 | Johnson | |
| 2008/0162773 A1 | 7/2008 | Clegg et al. | |
| 2008/0162987 A1 | 7/2008 | El-Batal | |
| 2008/0183937 A1 | 7/2008 | Cagno et al. | |
| 2008/0244620 A1 | 10/2008 | Cagno et al. | |
| 2008/0267192 A1 | 10/2008 | Blinick et al. | |
| 2009/0006697 A1 | 1/2009 | Doherty et al. | |
| 2009/0007154 A1 | 1/2009 | Jones | |
| 2009/0089473 A1* | 4/2009 | He | 710/300 |
| 2009/0094620 A1 | 4/2009 | Kalwitz et al. | |
| 2009/0125655 A1 | 5/2009 | Jones et al. | |
| 2009/0161537 A1* | 6/2009 | Andersson et al. | 370/225 |
| 2009/0222733 A1 | 9/2009 | Basham et al. | |
| 2010/0312962 A1* | 12/2010 | DeKoning et al. | 711/114 |

FOREIGN PATENT DOCUMENTS

| | | |
|---|---|---|
| JP | 2009181317 A | 8/2009 |
| JP | 2009187399 A | 8/2009 |
| JP | 2010061663 A | 3/2010 |
| JP | 2010061666 A | 3/2010 |
| WO | WO 2007001728 A1 | 1/2007 |
| WO | WO 2007146515 A2 | 12/2007 |
| WO | WO 2008045457 A2 | 4/2008 |

OTHER PUBLICATIONS

Lobue et al., "Surveying Today's Most Popular Storage Interfaces." Dec. 2002, Computer, vol. 35, No. 12, pp. 48-55.

Na et al., "Link analysis and design of high speed storage buses in backplane and cabling environments," Jun. 1-4, 2010, 2010 Proceedings of the Electronic Components and Technology Conference (ECTC), pp. 1929-1934.

Liao et al., "Managing Access Control Through SAS Zoning," Sep. 2005, PMC-Sierra, Inc., Document No. PMC-2051469, Issue 1, pp. 1-19.

Elliott, Robert C., "Serial Attached SCSI (SAS)", Working Draft American National Standard; Revision 5, Jul. 9, 2003.

Microsoft: "How Network Load Balancing Works", TechNet, Jan. 21, 2005; URL:http://technet.microsoft.com/en-us/lib (retrieved from internet Nov. 20, 2009).

* cited by examiner

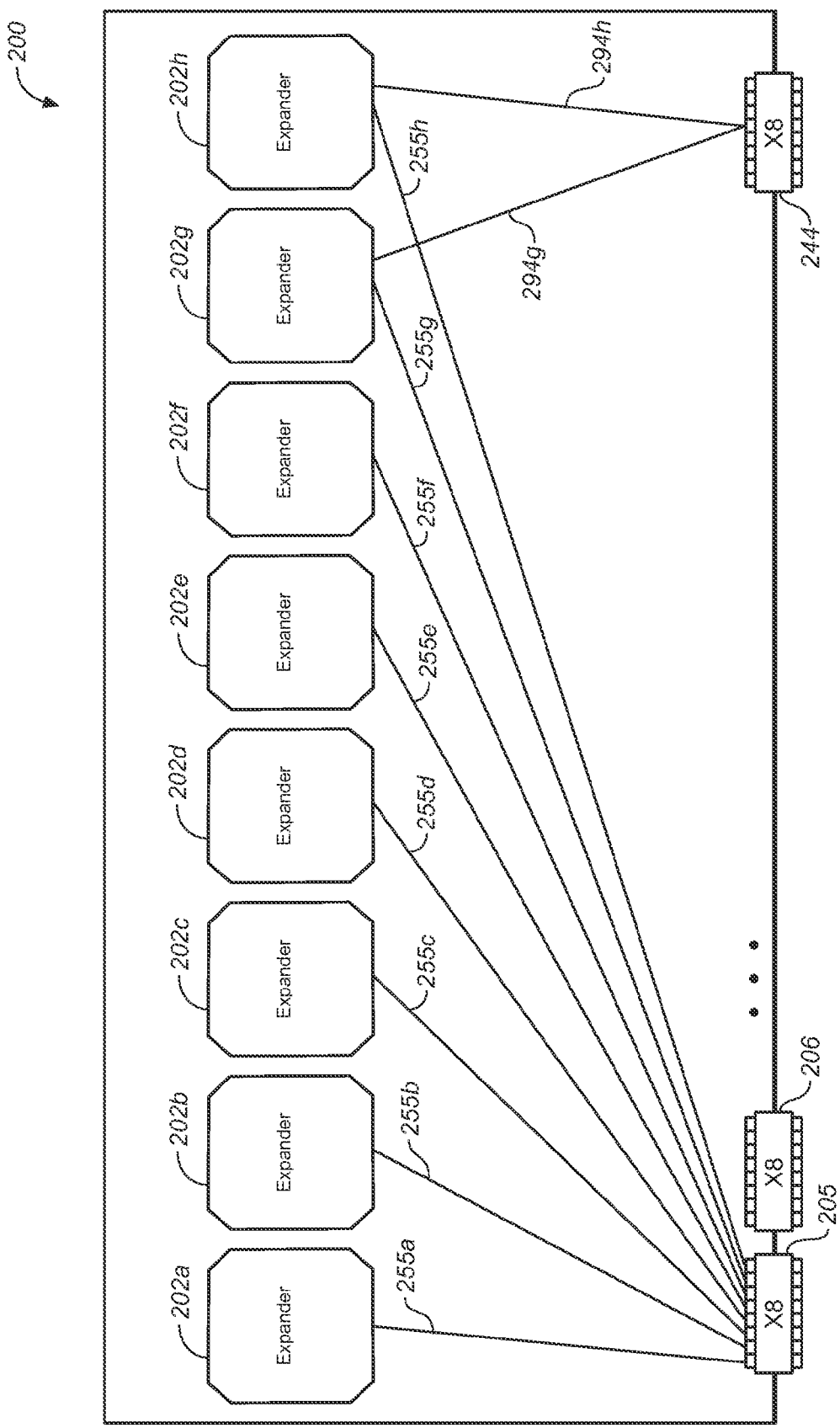

BACK-OFF RETRY WITH PRIORITY ROUTING

CROSS-REFERENCE TO RELATED APPLICATIONS

The present application claims priority from the following U.S. patent applications and is a continuation-in-part of U.S. patent application Ser. No. 12/384,291 entitled, "METHOD FOR PROVIDING PATH FAILOVER FOR MULTIPLE SAS EXPANDERS OPERATING AS A SINGLE SAS EXPANDER", filed Apr. 2, 2009 now U.S. Pat. No. 8,077,605;U.S. patent application Ser. No. 12/384,287 entitled, "SPECIFYING LANES FOR SAS WIDE PORT CONNECTIONS", filed Apr. 2, 2009 now U.S. Pat. No. 7,913,023; U.S. patent application Ser. No. 12/384,288 entitled, "SAS PAIRED SUBTRACTIVE ROUTING", filed Apr. 2, 2009 now U.S. Pat. No. 8,321,596; and U.S. patent application Ser. No. 12/791,244 entitled, "ALLEVIATING BLOCKING CASES IN A SAS SWITCH", filed Jun. 1, 2010.

Additionally, U.S. patent application Ser. No. 12/791,244 entitled, "ALLEVIATING BLOCKING CASES IN A SAS SWITCH", filed Jun. 1, 2010, now U.S. Pat. No. 8,244,948 claims priority from and is a continuation-in-part of U.S. patent application Ser. No. 12/384,289 entitled, "COMBINING MULTIPLE SAS EXPANDERS TO PROVIDE SINGLE SAS EXPANDER FUNCTIONALITY," now issued U.S. Pat. No. 7,849,248.

Further, U.S. patent application Ser. No. 12/384,289 entitled, "COMBINING MULTIPLE SAS EXPANDERS TO PROVIDE SINGLE SAS EXPANDER FUNCTIONALITY," now issued U.S. Pat. No. 7,849,248, filed Apr. 2, 2009; U.S. patent application Ser. No. 12/384,291 entitled, "METHOD FOR PROVIDING PATH FAILOVER FOR MULTIPLE SAS EXPANDERS OPERATING AS A SINGLE SAS EXPANDER", filed Apr. 2, 2009; U.S. patent application Ser. No. 12/384,287 entitled, "SPECIFYING LANES FOR SAS WIDE PORT CONNECTIONS", filed Apr. 2, 2009; and U.S. patent application Ser. No. 12/384,288 entitled, "SAS PAIRED SUBTRACTIVE ROUTING", filed Apr. 2, 2009 claim the benefit under 35 U.S.C. §119(e) of U.S. Provisional Application Ser. No. 61/191,037, filed Sep. 5, 2008.

In addition, the present application incorporates by reference all of the above applications.

TECHNICAL FIELD

The present disclosure generally relates to the field of Serial Attached SCSI (SAS), and more particularly to a back-off retry process implemented in a single, cohesive SAS expander context.

BACKGROUND

Serial Attached SCSI (SAS) is a term referring to various technologies designed to implement data transfer between computer devices. The SAS protocol is a serial successor to the parallel Small Computer System Interface. In the SAS protocol, all SAS devices are either an initiator device, a target device, or an expander device. Initiator devices are devices that begin an SAS data transfer, while target devices are the devices to which initiator devices transfer data. Together, initiator devices and target devices are known as end devices.

SAS expanders are devices that facilitate data transfer between multiple initiator devices and multiple target devices. The SAS protocol utilizes a point-to-point bus topology. Therefore, if an initiator device is required to connect to multiple target devices, a direct connection must be made between the initiator device and each individual target device in order to facilitate each individual data transfer between the initiator device and each individual target device. SAS expanders manage the connections and data transfer between multiple initiator devices and multiple target devices. SAS expanders may contain SAS devices.

SUMMARY

In one aspect, a method for back-off retry in a single, cohesive SAS expander may include, but is not limited to, routing a data transfer between an input of a single, cohesive SAS expander and an output of the single, cohesive SAS expander, wherein the single, cohesive expander includes a first SAS expander, and at least one additional SAS expander, wherein the first SAS expander is connected to the at least one additional SAS expander via at least one inter-expander link (IEL) for inter-expander communications, determining link availability between the first SAS expander and a port of a device, then, upon determination of a failed link or a busy link between the first SAS expander and the port of the device, re-routing the data transfer of the first SAS expander to a second SAS expander. The method further includes determining link availability between the second SAS expander and the port of the device, and, upon determination of a failed link or a busy link between the second SAS expander and the port of the device, re-routing the data transfer from the second SAS expander to the first SAS expander or a third SAS expander, or retrying the data transfer through the second SAS expander.

In another aspect, a method for back-off retry with priority routing in a single, cohesive expander may include, but is not limited to, routing a data transfer between an input of a single, cohesive SAS expander and an output of the single, cohesive SAS expander. The routing of data further includes routing a first OPEN request on a direct path through a first SAS expander to a port of a device while routing a second OPEN request on an alternate path from the first SAS expander and through a second SAS expander to the port of the device. The method further includes determining link availability between the second SAS expander and the port of the device, and, upon determination of a failed link or a busy link, re-routing the data transfer from the second SAS expander to the first SAS expander or a third SAS expander, or retrying the data transfer through the second SAS expander.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIGS. 2A through 2E are block diagrams illustrating various configurations of a single, cohesive SAS expander;

DETAILED DESCRIPTION

Figure 1:
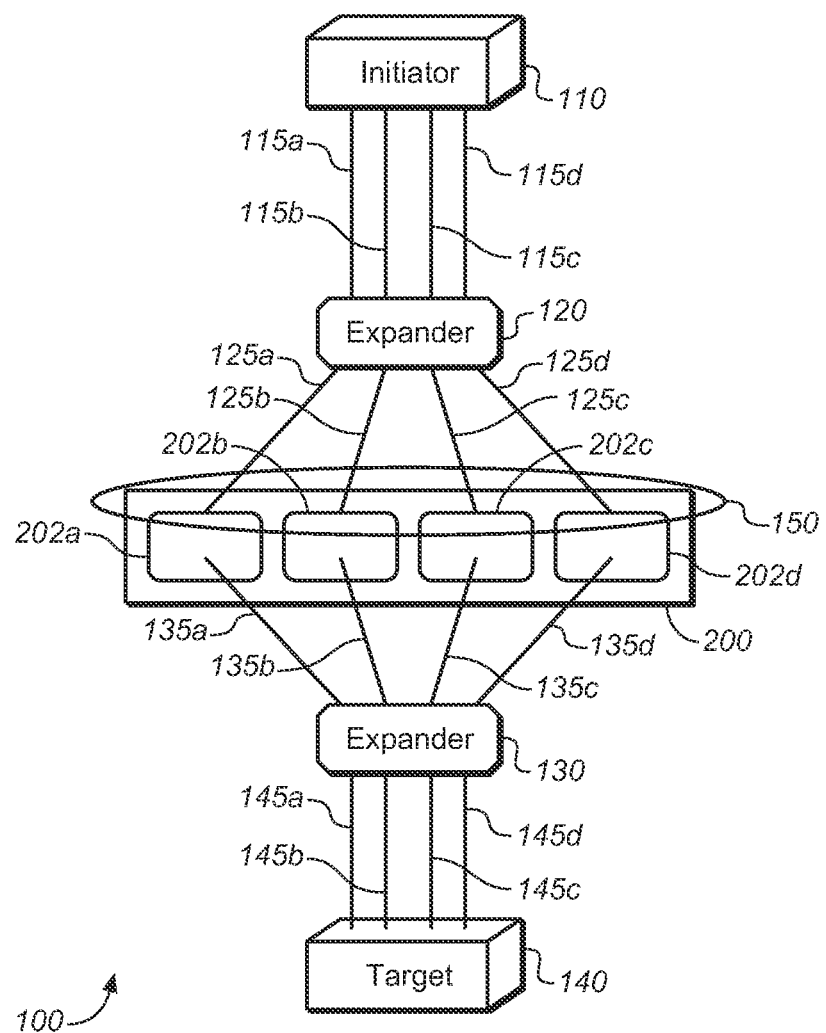
FIG. 1 is a block diagram illustrating a SAS topology illustrating a single, cohesive SAS expander.
Figure 2A:
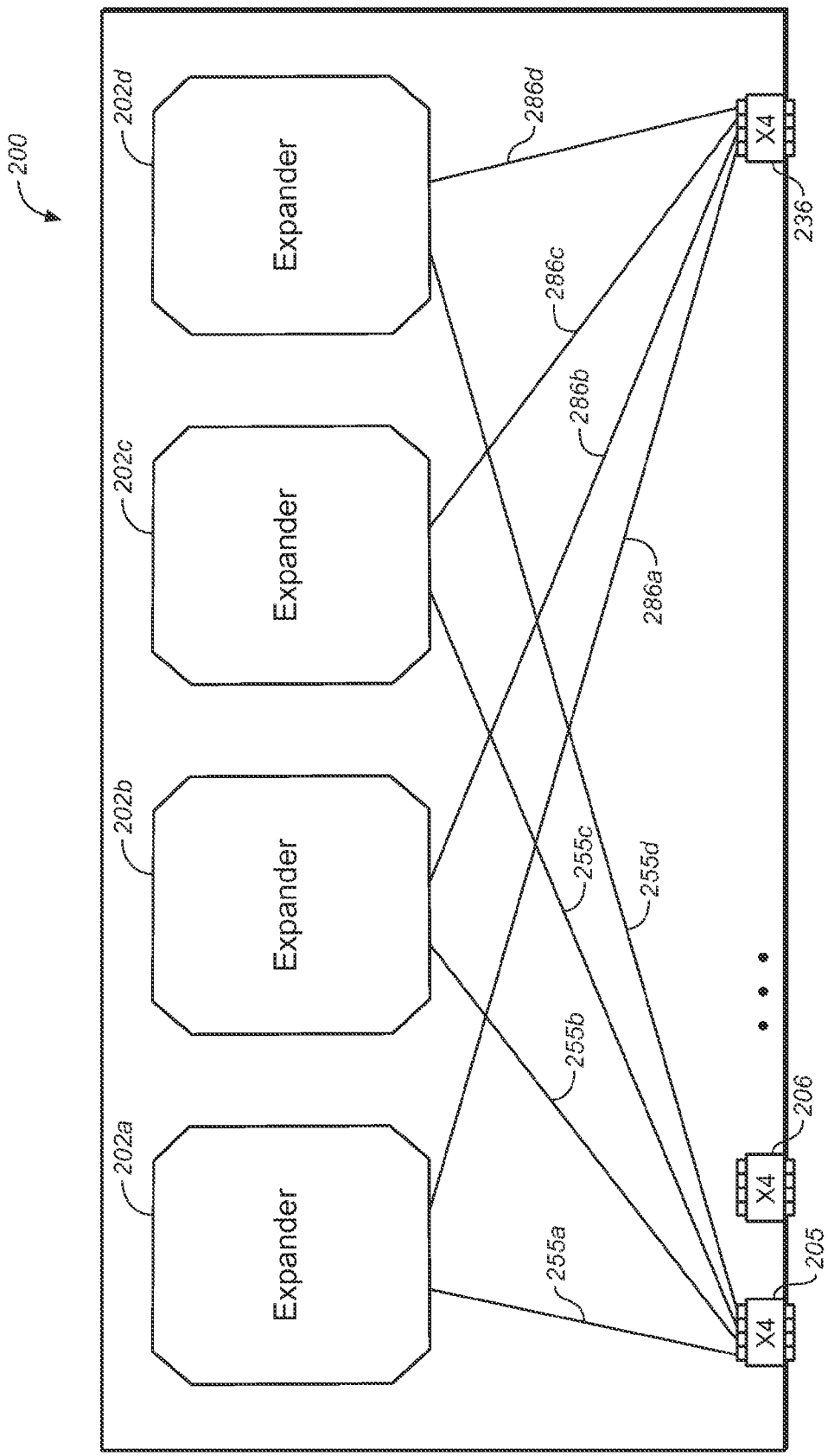
Figure 2B:
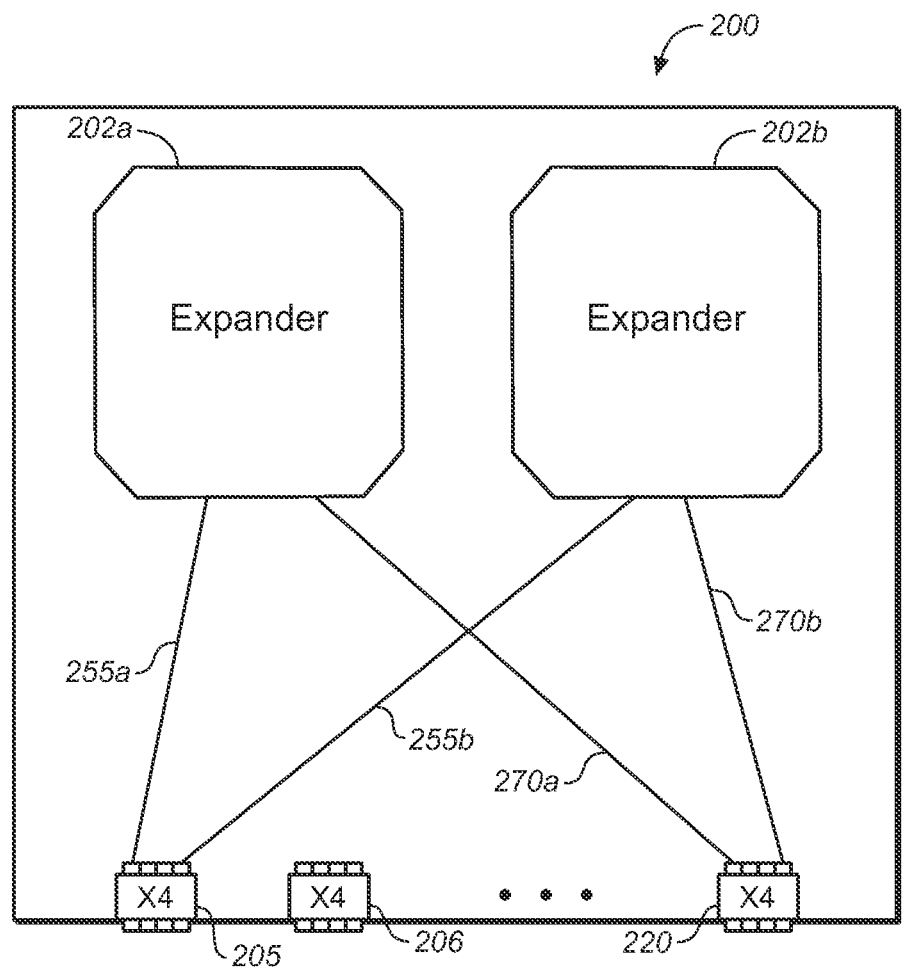
Figure 2C:
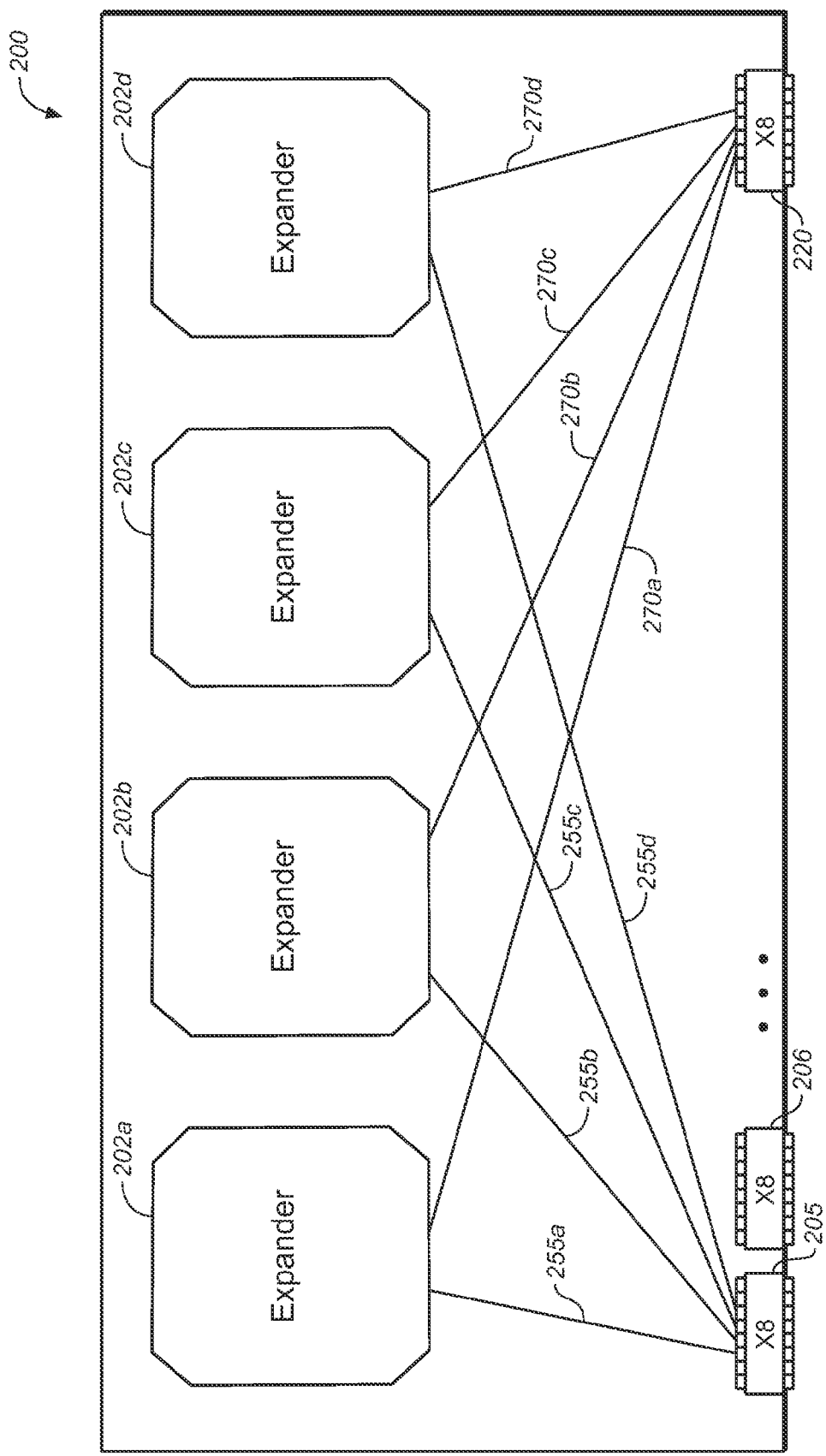
Figure 2D:
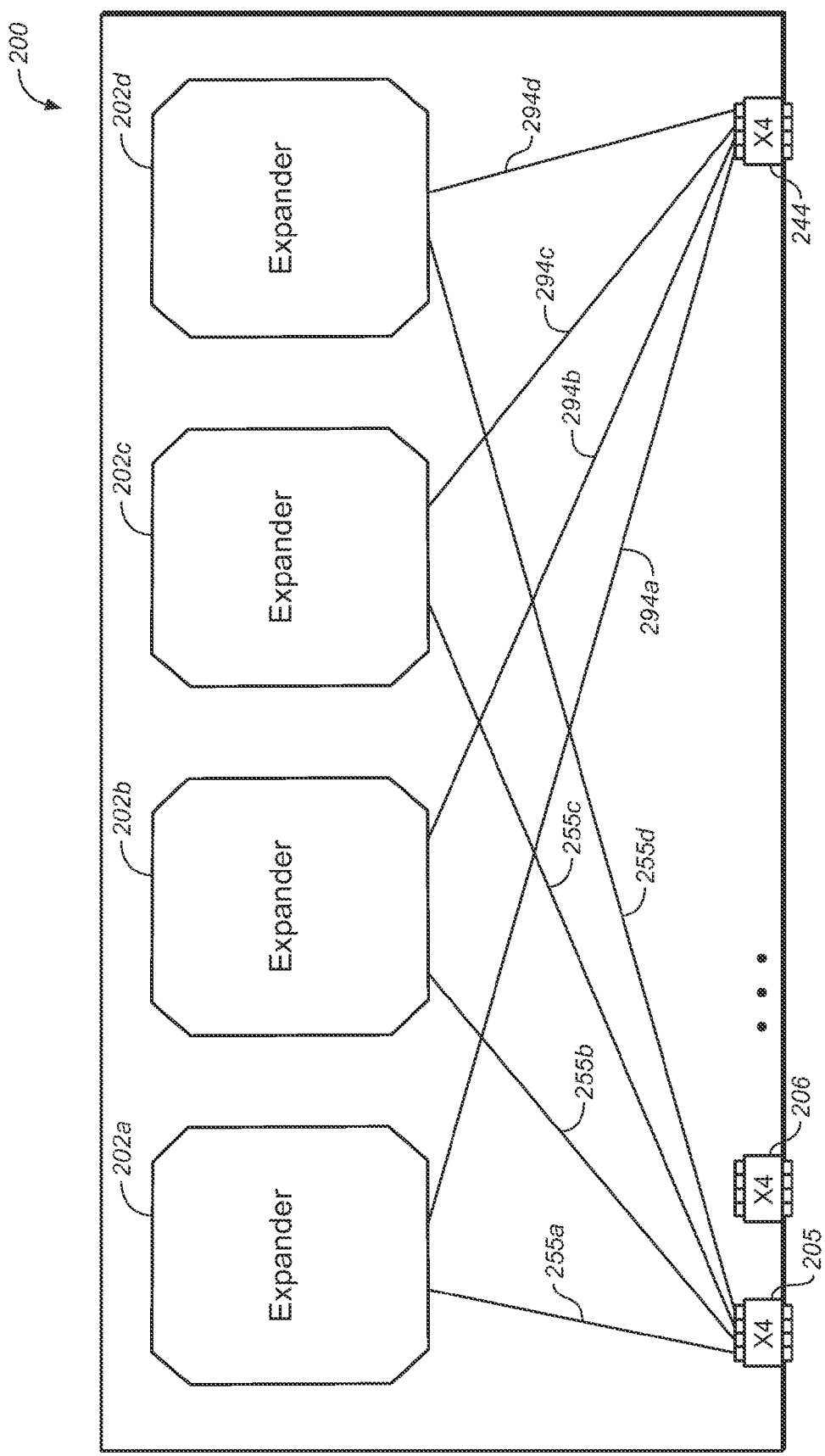

Reference will now be made in detail to the subject matter disclosed, which is illustrated in the accompanying drawings.

A SAS topology featuring a single, cohesive SAS expander in accordance with an exemplary embodiment of the present disclosure is shown. The topology 100 may include initiator 110 connected to expander 120 via narrow ports 115a . . . d. Expander 120 may be connected to single, cohesive SAS expander 200 via narrow ports 125a . . . d. Single, cohesive SAS expander 200 may contain a plurality of physically separate SAS expanders 202a . . . d. SAS expanders 202a . . . d may be configured to share an identical SAS address to combine narrow ports 125a . . . d to behave as single common wide port 150. As shown in SAS topology 100, narrow ports 125a . . . d may combine to make x4-wide port 150. SAS expanders 202a . . . d may be connected to expander 130 via narrow ports 135a . . . d. Expander 130 may be connected to target 140 via narrow ports 145a . . . d. SAS specifications require that all connections be point-to-point. However, SAS topology 100 is SAS specification compliant because wide port 150 is a true SAS wide port.

Referring to FIGS. 2A-2E, cohesive SAS expander 200 may contain a plurality of physically separated SAS expanders 202a . . . h. SAS expanders 202a . . . h may be connected to output ports 205-244 via links 255a . . . h-294a . . . h. Widely varying configurations of single, cohesive SAS expander 200 are contemplated by the present disclosure, depending on the number of SAS expanders 202a . . . h, the number of ports of SAS expanders 202a . . . h, the number of output ports 205-244, the width of output ports 205-244, and the number of SAS expander ports used in links 255a . . . h-294a . . . h.

Output ports 205-244 may be wide ports. Output ports 205-244 may be configured to share an identical SAS address. Under SAS specifications, this defines output ports 205-244 to be a single wide port of the same expander. Each of output ports 205-244 may be connected to every SAS expander 202a . . . h (Not shown). The width of output ports 205-244 may depend on how many SAS expander ports are used in links 255a . . . h-294a . . . h to connect to each of output ports 205-244. Each of SAS expander 202a . . . h may have multiple SAS expander ports connected to each of output ports 205-244. For example, if single, cohesive SAS expander 200 contains two SAS expanders 202a-h connected to each of output ports 205-244 via links 255a . . . h-294a . . . h using one SAS expander port, then output ports 205-244 will be a x2 wide port. Furthermore, if single, cohesive SAS expander 200 contains two SAS expanders 202a-h connected to each of output ports 205-244 via links 255a . . . h-294a . . . h using two SAS expander ports, then output ports 205-244 will be a x4 wide port. These configurations may allow for simultaneous access of any port to any other port of single, cohesive SAS expander 200 at full port bandwidth.

Figure 3:
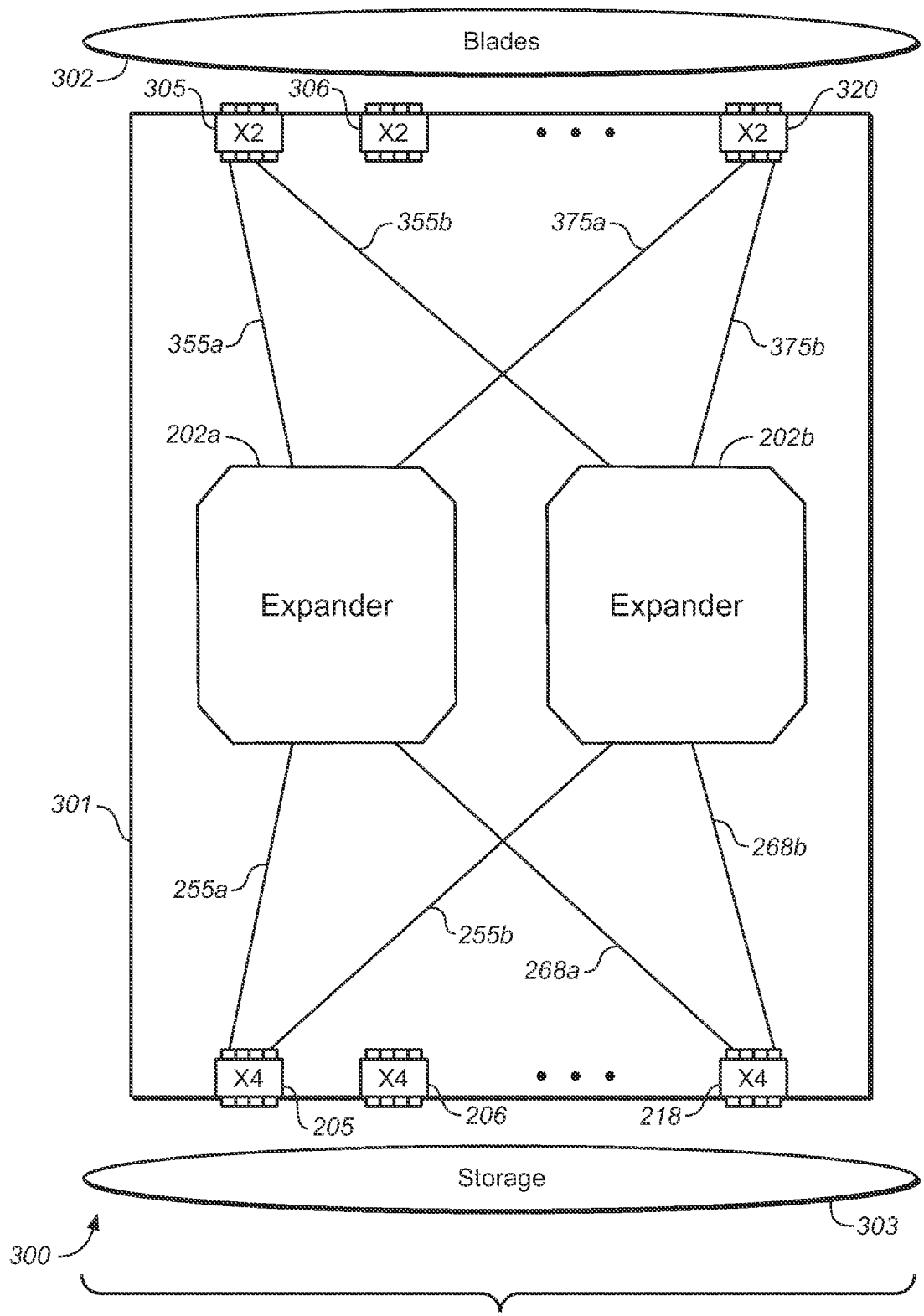
FIG. 3 is block diagram illustrating a blade center switch configuration of a single, cohesive SAS expander.

A blade center switch configuration 301 of single, cohesive SAS expander 300 is provided. Referring to FIG. 3, multiple CPU blades 302 may be connected to input ports 305-320. Input ports 305-320 may be wide ports. Input ports 305-320 may be configured to share an identical SAS address. Under SAS specifications, this defines input ports 305-320 to be a single wide port of the same expander. Each of input ports 305-320 may be connected to each of SAS expanders 202a . . . b via links 355a . . . b-375a . . . b (Not shown). As shown in blade center switch configuration 301, input ports 305-320 are x2 wide ports connected to two SAS expanders 202a . . . b via links 355a . . . b-375a . . . b using one SAS expander port, but other configurations are fully contemplated by these disclosures. Each of SAS expanders 202a . . . b may be connected to each of output ports 205-218 via links 255a . . . b-268a . . . b (Not shown). As shown in blade center switch configuration 301, output ports 205-218 are x4 wide ports connected to two SAS expanders 202a . . . b via links 255a . . . b-268a . . . b using two SAS expander ports, but other configurations are fully contemplated by the current disclosure. Output ports 205-218 may be connected to multiple data storage devices 303.

Figure 4:
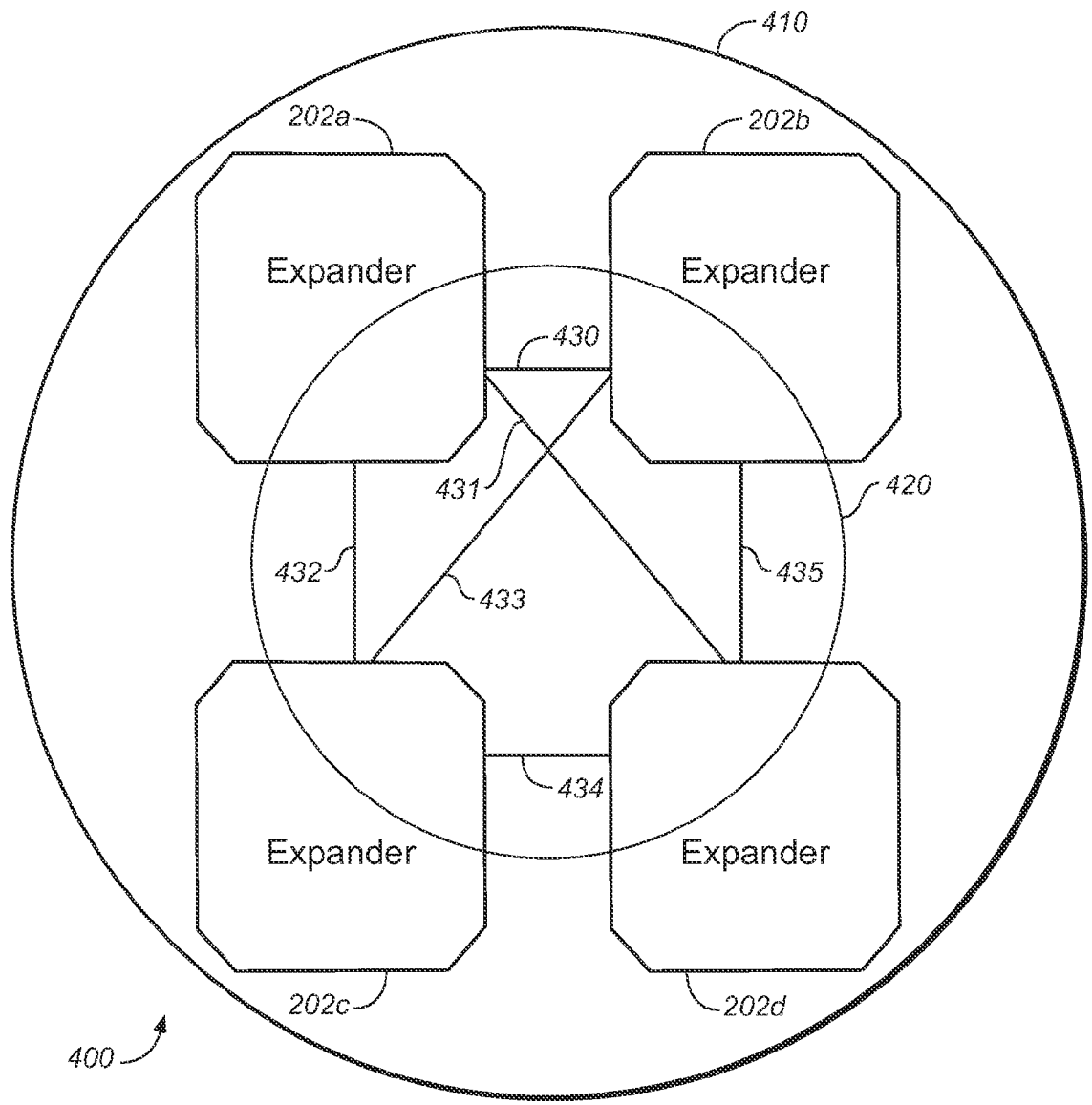
FIG. 4 is a block diagram illustrating the inter-expander links of a single, cohesive SAS expander.

SAS expanders 202a . . . h may be configured to share an identical SAS address. Under SAS specifications, this defines SAS expanders 202a . . . h to be a single expander. Firmware may run on each of SAS expanders 202a . . . h so SAS expanders 202a . . . h behave and respond as a single expander. As shown in FIG. 4, each of SAS expanders 202a . . . h may be connected to each of 202a . . . h via inter-expander links (IEL) 430-435. IEL 430-435 may allow SAS expanders 202a . . . h to communicate and coordinate to behave and respond as a single expander. IEL 430-435 may communicate via the SAS Management Protocol (SMP) or other communication methods, such as Inter-Integrated Circuit Bus Protocol (I2C), Enhanced Parallel Port (EPP), Ethernet, shared memory, and the like. IEL 430-435 may permit the IEL domain 420 to be zoned from primary switched domain 410. Broadcasts may be disabled in IEL 430-435 to eliminate any SAS specification non-compliant loop issues. IEL 430-435 may use multiple SAS expander ports. The phys used in IEL 430-435 may be completely hidden from the primary switched domain. The numbering of the phys used in the primary switched domain of SAS expanders 202a . . . h may be remapped to a single, logical numbering. IEL 430-435 may allow any combination of SAS expanders 202a . . . h to fail while connectivity is maintained between any functional SAS expanders 202a . . . h. Further, all input ports 305-320 and output ports 205-244 may maintain connectivity at a reduced bandwidth in the event of less than every SAS expander 202a . . . h failing. SMP target processing may be handled by a single master SAS expander of single, cohesive SAS expander 200. Connection requests to single, cohesive SAS expander 200 may be routed to the single master SAS expander via IEL 430-435. SAS expanders 202a . . . h may share SMP target processing.

Figure 6:
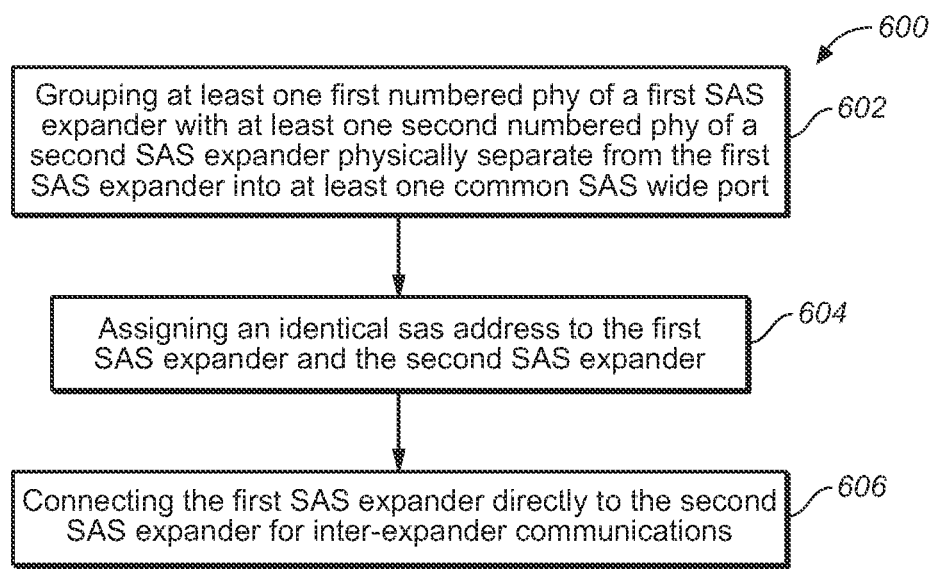
FIG. 6 is a flow diagram illustrating a method for combining multiple SAS expanders to operate as a single, cohesive SAS expander.

Referring generally to FIG. 6, a method for combining multiple SAS expanders is shown. For example, the method may implement techniques for connecting and combining SAS expanders as described below (and as shown in FIGS. 1, 2A through 2E, 3, and 4). The method 600 may include the step of grouping at least one first numbered phy of a first SAS expander with at least one second numbered phy of a second SAS expander physically separate from the first SAS expander into at least one common SAS wide port 602. For example, the grouping into at least one common SAS wide port (205-244) may include assigning an identical SAS address to the at least one common wide port (205-244).

The method 600 may further include the step of assigning an identical SAS address to the first SAS expander and the second SAS expander 604. Assigning an identical SAS address to the first SAS expander and the second SAS expander may allow the first SAS expander and the second SAS expander to behave and respond as a single, cohesive SAS expander 200. The assigning may be performed via firmware executing on the first SAS expander and the second SAS expander. Further, the phy numbering of the first SAS expander and the second SAS expander may be remapped to appear as a single, logically ordered phy numbering of a single, cohesive SAS expander. For example, a first numbered phy of the first SAS expander may be remapped to be in a first range of the single, logically ordered numbering and a second numbered phy of the second SAS expander may be remapped to be in a second range of the single, logically ordered numbering.

The method 600 may further include the step of connecting the first SAS expander directly to the second SAS expander for inter-expander communications 606. The inter-expander communications may utilize SMP communications or other communication methods, such as Inter-Integrated Circuit Bus Protocol (I2C), Enhanced Parallel Port (EPP), Ethernet, shared memory, and the like. In additional embodiments, the connection between the first SAS expander and the second SAS for inter-expander communications (430-435) may be performed via the phys of the first SAS expander and the phys of the second SAS expander. Further, the phys of the first SAS expander for inter-expander communications and the phys of the second SAS expander for inter-expander communications may be hidden from the primary switched domain (410) of the single, cohesive SAS expander. At least two phys of the first SAS expander and at least two phys of the second SAS expander may be used for inter-expander communications between the first SAS expander and the second SAS expander. Further, if at least one SAS expander within the single, cohesive SAS expander remains operational (e.g., such as during an SAS expander failure), all common SAS wide ports remain operational, with all common SAS wide ports operating at a reduced bandwidth.

Figure 5:
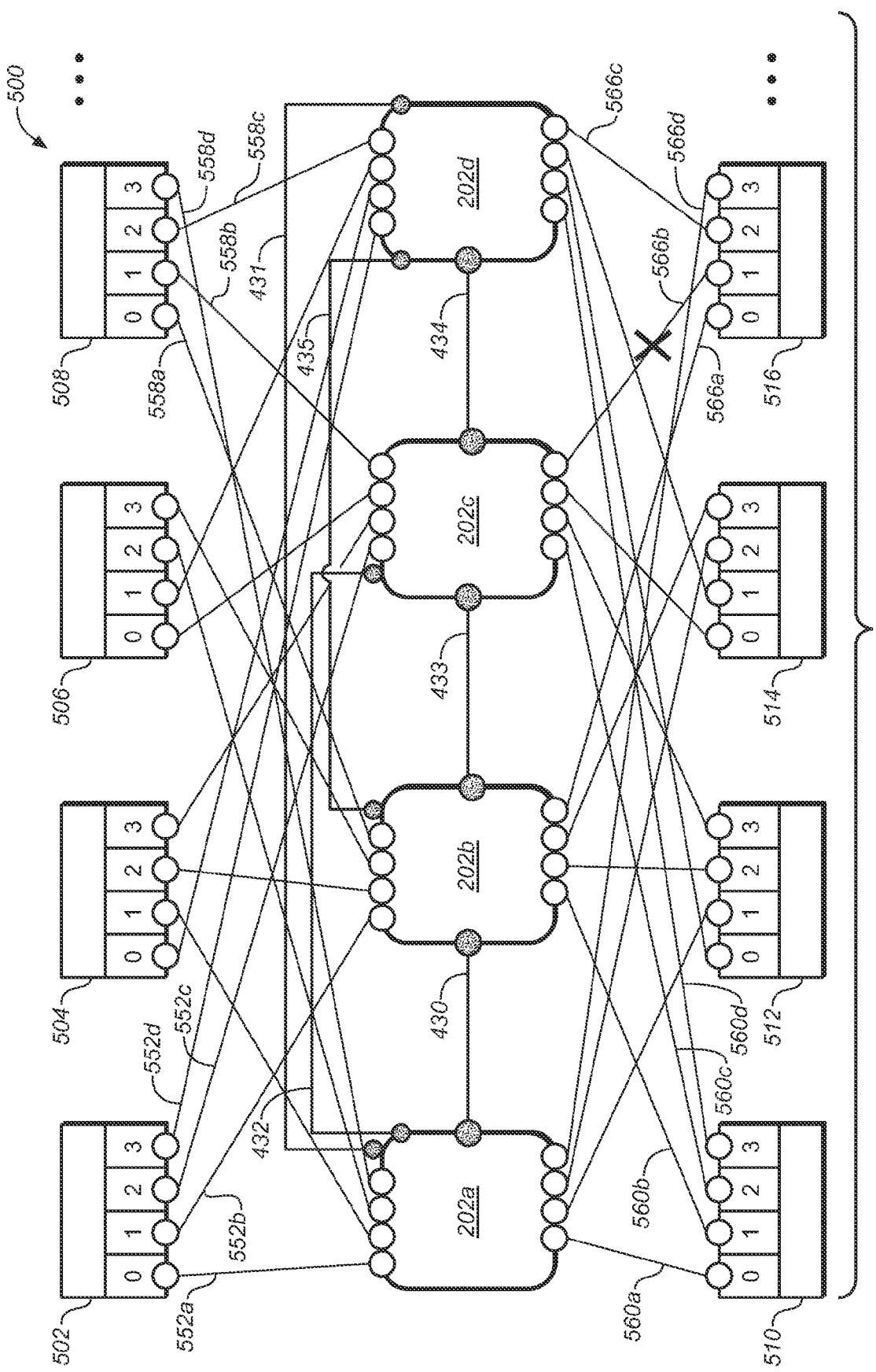
FIG. 5 is a block diagram illustrating a failed internal link within a single, cohesive SAS expander.

The single, cohesive SAS expander 500 may be configured to provide path failover when an internal link fails within the single, cohesive SAS expander. Referring to FIG. 5, and as described above, input ports 502-508 may be connected to each SAS expanders 202a . . . d via links 552a . . . d-558a . . . d. Further, input ports 502-508 may be SAS wide ports. Output ports 510-516 may be connected to each SAS expanders 202a . . . d via links 560a . . . d-566a . . . d. Further, output ports 510-516 may be SAS wide ports. Each of SAS expanders 202a . . . d may be connected to each other via SAS expander ports for inter-expander communications. As shown in single, cohesive SAS expander 500, the link 566b between SAS expander 202c and output port 516 may fail. For example, a physical defect may cause link 566b to fail. As a further example, link 566b may fail to due a logical problem.

The data transfer intended to be transmitted via failed link 566b may be re-routed to another SAS expander connected to output port 516. This data transfer may be re-routed to another SAS expander via the phys used for inter-expander communications between the SAS expanders. As shown in single, cohesive SAS expander 500, the data transfer between SAS expander 202c and output port 516 via failed link 566b may be re-routed through SAS expander 202d via inter-expander communications link 434. From SAS expander 202d, the data transfer may be re-routed to output port 516 via link 566c. Thus output port 516 may receive the data transfer as originally intended, but may receive the data transfer on a different phy. Further, if SAS expander 202d already has an active link to output port 516, SAS expander 202c may respond to the SAS initiator with an arbitration in progress (AIP), as provided via SMP. The SAS initiator may attempt the data transfer at a later time after receiving an AIP or OPEN REJECT (RETRY) SMP response from SAS expander 202c.

In a further aspect of the present disclosure, firmware executing on the SAS expanders may reprogram the SAS expander route tables to re-route connections through inter-expander communications links (430-435) instead of through the failed links. Further, a SAS initiator connected to the single, cohesive SAS expander may learn that link 566b has failed by receiving a CHANGE primitive. For example, SMP provides a CHANGE primitive. The SAS initiator may then perform a SAS Discovery, for example, as provided via SMP. Further, the SAS initiator may note the number of remaining active connections to the target, and may only initiate a number of simultaneous data transfers equal to the number of remaining active connections to the target.

Figure 7:
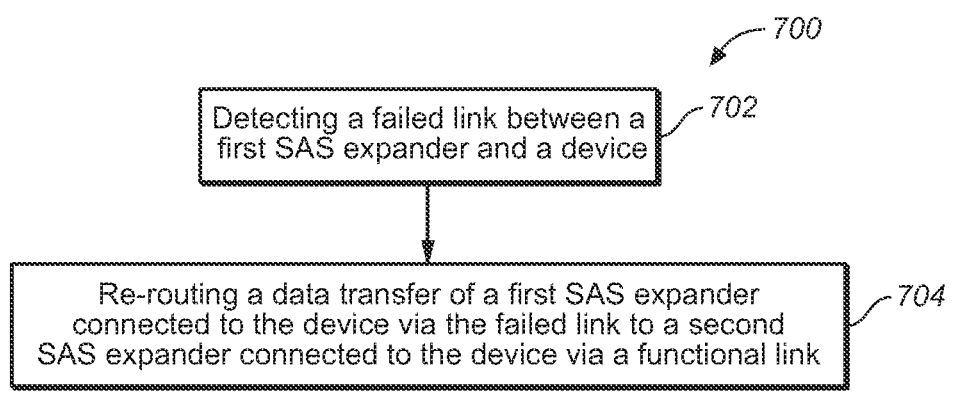
FIG. 7 is a flow diagram illustrating a method for providing path failover when a link fails within a single, cohesive SAS expander

Referring generally to FIG. 7, a method for providing path failover while combining multiple SAS expanders to act as a single, cohesive SAS expander is shown. For example, the method may implement techniques as shown in FIG. 5. In one embodiment of the current invention, the method 700 includes the step of detecting a failed link between a first SAS expander and a device 702. For example, the detected failed link may fail due to a physical problem. The detected failed link may fail due to a logical problem.

The method 700 may further include the step of re-routing a data transfer of the first SAS expander connected to the device via the failed link to a second SAS expander connected to the device via a functional link 704. For example, the failed link of the single, cohesive SAS expander may fail due to a physical problem within the failed link. In another example, the failed link may fail due to a logical problem. The first SAS expander may be connected to the second SAS expander via the phys of the first SAS expander and the phys of the second SAS expander for inter-expander communications. In further embodiments, the re-routing a data transfer of a SAS expander connected to a device via the failed link to a second SAS expander connected to the device via the functional link may occur via the phys of the first expander for inter-expander communications and the phys of the second SAS expander for inter-expander communications. In exemplary embodiments, the re-routing a data transfer may include reprogramming a route table of the first SAS expander to re-route the data transfer from the failed internal link to the links between via the phys of the first expander for inter-expander communications and the phys of the second SAS expander for inter-expander communications. For example, the reprogramming of the route table of the first SAS expander may be performed via firmware executing on the first SAS expander.

The step of re-routing data transfers from a failed link within the single, cohesive SAS expander to a second SAS expander via a link for inter-expander communications may not indicate to SAS initiators and SAS targets connected to the single, cohesive SAS expander that such re-routing is occurring. However, if the second SAS expander currently has an active link to the device and data is re-routed from the failed link to the second SAS expander, the first SAS expander connected to the device via the failed link may respond with an AIP response. In such a case, a SAS initiator receiving the AIP response may retry the data transfer at a later time. A SAS initiator connected to the single, cohesive SAS expander may be notified of the failed link via receiving a CHANGE primitive. Upon receiving a CHANGE primitive, the SAS initiator may perform a SAS Discovery. For example, SMP provides a SAS Discovery, which includes a SAS Discover and a SAS Discover response.

Figure 8:
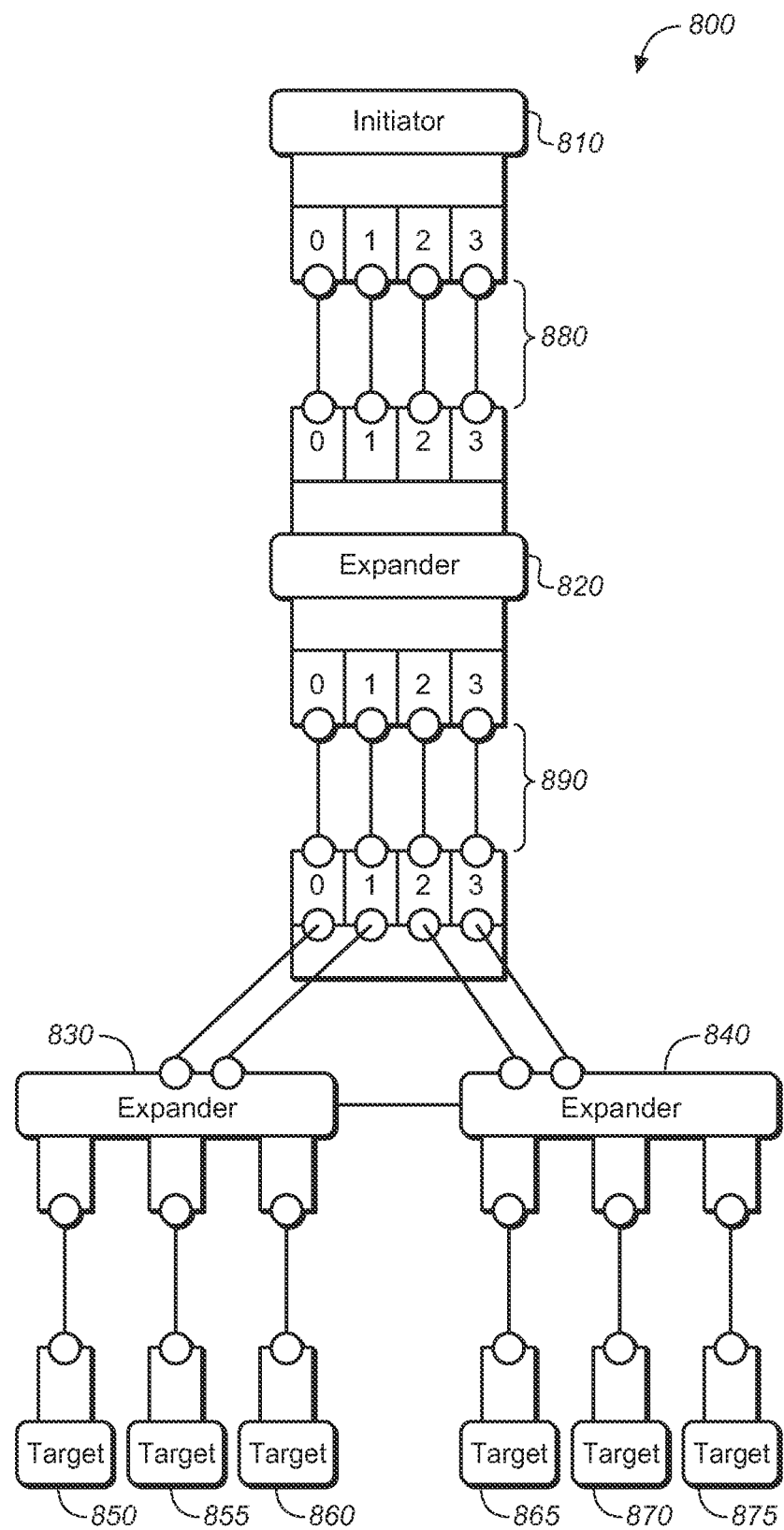
FIG. 8 is a block diagram illustrating selecting lanes of SAS wide ports for a data connection with a single, cohesive SAS expander.

A SAS-initiator specified data connection configuration 800 is provided. Referring to FIG. 8, SAS initiator 810 may be connected to SAS expander 820 via SAS wide port 880. At least one phy of SAS expander 830 and at least one phy of SAS 840 may be combined in common SAS wide port 890. In order for SAS expander 830 and SAS expander 840 to operate as a single, cohesive SAS expander, SAS expander 830 may share an identical SAS address with SAS expander 840. SAS expander 820 may be connected to SAS expander 830 and SAS expander 840 via common SAS wide port 890. SAS expander 830 may also be directly connected to SAS expander 840 via an inter-expander communications link via the phys of SAS expander 830 and the phys of SAS expander 840. SAS expander 830 and SAS expander 840 may not operate as a single, cohesive SAS expander, and may be in a cascaded configuration. A plurality of SAS targets 850-875 may be connected to SAS expander 830 and SAS expander 840 via a SAS narrow port. The number of SAS targets 850-875 may be greater than the number of phys on SAS expander 830 or SAS expander 840. For example, SAS targets 850-875 may be a hard disk array such as a Just a Bunch Of Disks (JBOD) SAS array.

SAS initiator 810 may specify the lanes of wide ports 880, 890 to be used to create a data connection from SAS initiator 810 to one of SAS targets 850-875. Specifying the lanes of wide ports 880, 890, may be used for fairness control, where some lanes of wide ports 880, 890 may be used to access SAS targets 850-875 and other lanes of wide ports 880, 890 may be used to pass through to other parts of a SAS configuration. SAS initiator 810 may further specify the lanes within an OPEN frame of a connection request. Such an OPEN frame may be provided via an SMP connection request. SAS initiator 810 may have learned the optimal lanes for a data connection from SAS initiator 810 to one of SAS targets 850-875 via a performing a standard SAS discovery process. SAS expander 830 and SAS expander 840, along with SAS targets 850-875 may be configured to respond via the SMP Discover response with the optimal lanes for a data connection from SAS initiator 810 to one of SAS targets 850-875. Each SAS expander in the data connection between SAS initiator 810 and one of SAS targets 850-875 may check the OPEN frame of the connection request from SAS initiator 810 for the allowed lanes for the data connection and only makes a data connection on those specified lanes.

Figure 9:
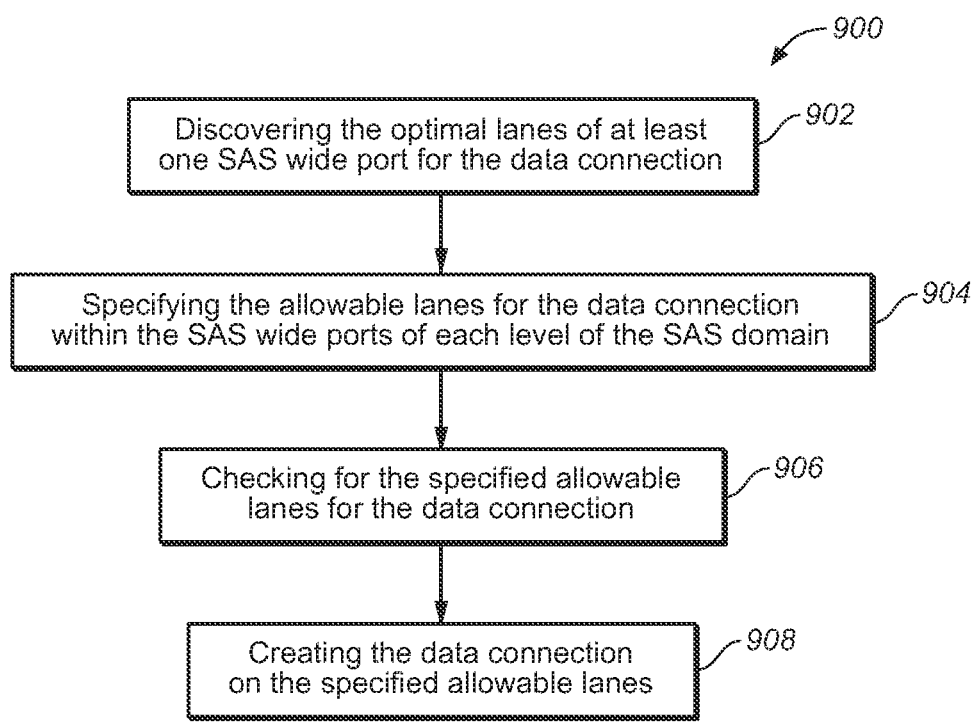
FIG. 9 is a flow diagram illustrating a method for specifying lanes of SAS wide ports for a data connection with a single, cohesive SAS expander.

Referring generally to FIG. 9, a method for specifying allowable lanes of a SAS wide port for a data connection between a SAS initiator and a SAS target in a SAS domain in accordance with an exemplary embodiment of the present disclosure is shown. In a current embodiment of the present disclosure, method 900 includes the step of discovering the optimal lanes of at least one SAS wide port for the data connection 902. For example, SAS initiator 810 may discover the optimal lanes for the data connection via performing a standard SAS discovery process. Further, the SMP Discover response may be used to communicate the optimal lanes for the data connection to SAS initiator 810.

The method 900 may further include the step of specifying the allowable lanes for the data connection within the SAS wide ports of each level of the SAS domain 904. For example, the allowable lanes for the data connection may be specified via a SAS initiator connection request. The allowable lanes for the data connection may further be specified within an OPEN frame of a SAS initiator connection request.

The method 900 may further include the step of checking for the specified allowable lanes for the data connection 906. For example, when a SAS expander (820-840) receives an OPEN frame of a SAS initiator connection request, the SAS expander may check the OPEN frame for the specified allowable lanes for the data connection.

The method 900 may further include the step of creating the data connection of the specified allowable lanes 908. For example, a SAS expander may create the data connection on the specified allowable lanes. Further, the SAS expander may create the data connection after checking the OPEN frame of a SAS initiator connection request for the specified allowable lanes.

Figure 10A:
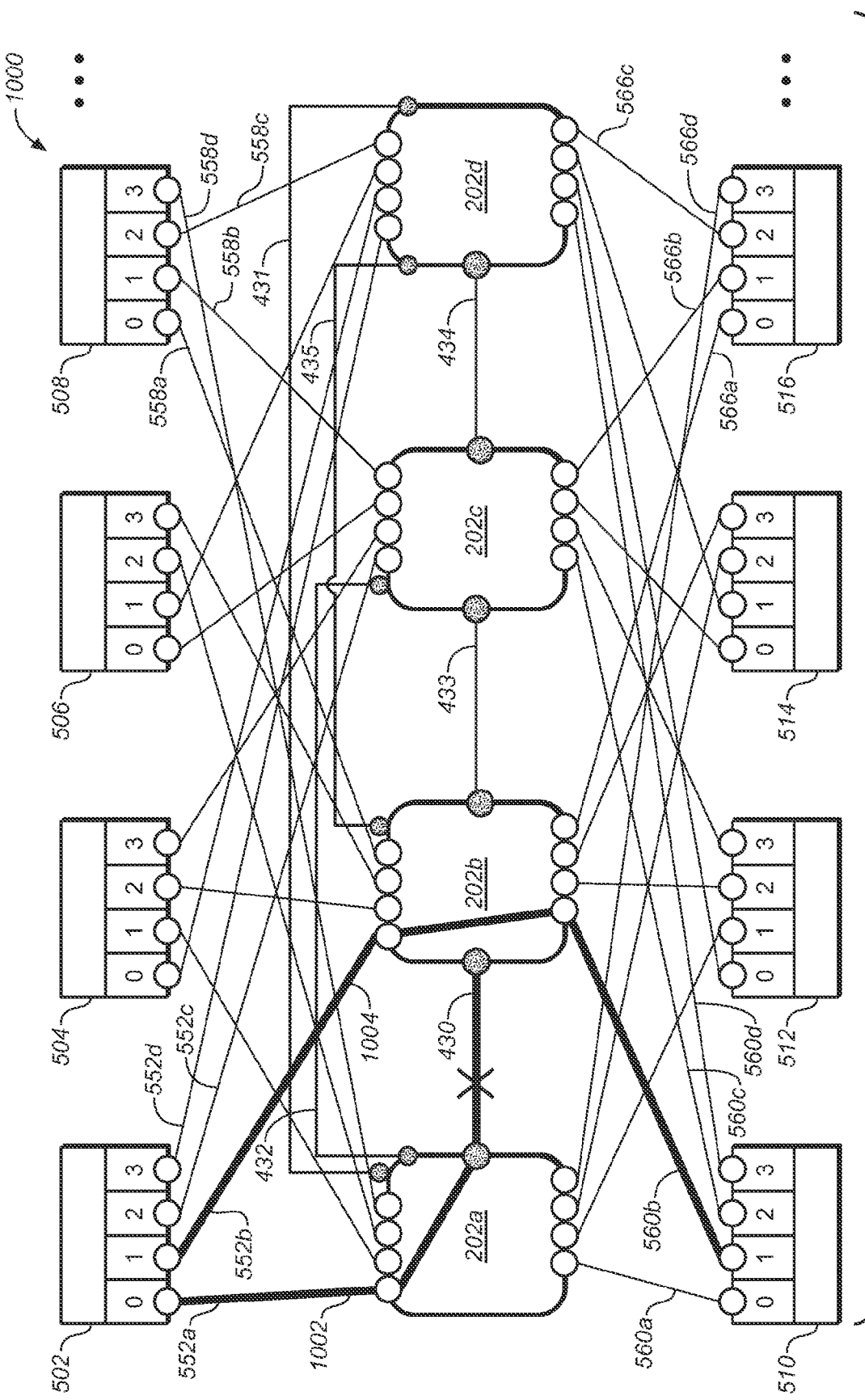
FIG. 10A is a block diagram illustrating phy blocking resulting from a lack of priority routing.
Figure 10B:
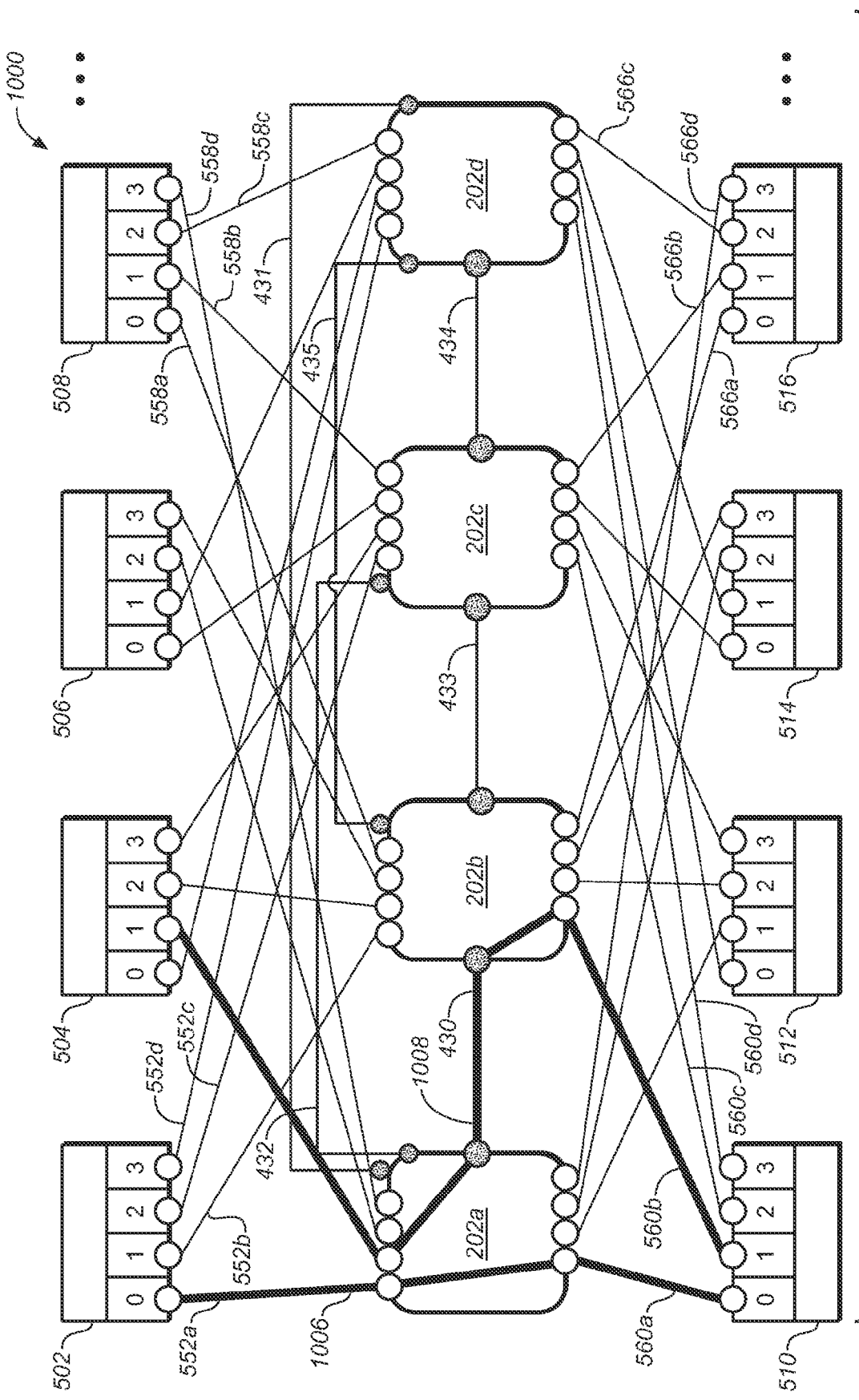
FIG. 10B is a block diagram illustrating a method for priority routing.

Referring generally to FIGS. 10A and 10B, the single, cohesive SAS expander 1000 may be configured to provide priority routing to limit blocking within the single, cohesive expander 1000. As previously described herein, the input ports 502-508 may be connected to each of the SAS expanders 202a ... *d* via links 552a ... *d*-558a ... *d*. Further, input ports 502-508 may be SAS wide ports. Output ports 510-516 may be connected to each SAS expanders 202a ... *d* via links 560a ... *d*-566a ... *d*. Further, output ports 510-516 may be SAS wide ports. It is recognized that without providing a connection between the individual SAS expanders 202a ... *d* via the IEL paths (e.g., 430-435) a blocking condition may occur in the single, cohesive expander 1000 when OPEN requests are sent by initiators on two or more connectors through one of the individual expanders 202a ... *d* of the single, cohesive expander 1000. In order to limit this blocking condition, each of SAS expanders 202a ... *d* may be connected to each other via SAS expander ports for inter-expander communications.

As illustrated in FIG. 10A, it is recognized that without priority routing a blocking condition may also occur in the single, cohesive expander 1000 when two or more OPEN requests are sent by initiators on an input port through two or more of the individual expanders 202a ... *d* of the single, cohesive expander 1000. For example, blocking may occur when an initiator on input port 502 sends an OPEN request from phy 0 of the input port 502 through expander 202a intended for output port 510 and an initiator on input port 502 sends an OPEN request from phy 1 of the input port 502 through expander 202b intended for output port 510. Without priority routing, an expander, such as 202a, may employ a round robin arbitration method to select a phy of the unused phys available for routing to the selected designation. Without priority routing, the expander 202a would then, in some instances, route the single OPEN request along the indirect path 1002, wherein the OPEN request is routed along the IEL path 430 to the second expander 202b.

As a result, if the expander 202a selects the IEL path 430 after being presented with only a single OPEN request from input port 502 blocking may occur on the second expander 202b. More specifically, if the second expander 202b is also routing an OPEN request from an initiator of input port 502 to output port 510, as illustrated by path 1004, the first expander 202a will be unable to establish an indirect path to output port 510 via the second expander 202b, as illustrated by the "X" on IEL path 430.

As illustrated in FIG. 10B, the blocking described in the preceding description may be avoided by implementing a priority routing scheme in the single, cohesive expander 1000. A priority routing scheme may include, first, routing a first OPEN request along a direct path (e.g., 1006) through an expander, and, second, routing a second OPEN request along an alternate path (e.g., 1008) from a first expander to a second expander via an IEL path.

In one embodiment, priority routing may include routing a first OPEN request by an initiator of an input port 502-508 along a direct path through an expander 202a . . . 202d to a designated output port 510 . . . 516. For example, a first OPEN request by an initiator on input port 502 may be routed by a first expander 202a on a direct path 1006 to phy 0 of output port 510, while a second OPEN request by an initiator on input port 504 may be routed by the first expander 202a on an alternate path 1008 via the IEL path 430 connecting the first expander 202a and a second expander 202b. The second expander 202b may then route the second request to phy 1 of output port 510. By utilizing the alternate path 1008 only when an expander receives a second OPEN request and always routing a first OPEN request along the direct path 1006, the overall single, cohesive expander 1000 may avoid or limit unnecessary phy blocking.

It should be recognized that while the above description describes the concept of priority routing in the context of expanders 202a and 202b, input port 502 and input port 504, phy 0 and phy 1 of input port 502, and phy 0 and phy 1 of output port 510 this concept can readily and logically be extended to all of the remaining expanders, input ports, output ports, and phys of the presently described invention as the above description does not represent a limitation but merely an illustration.

Figure 11A:
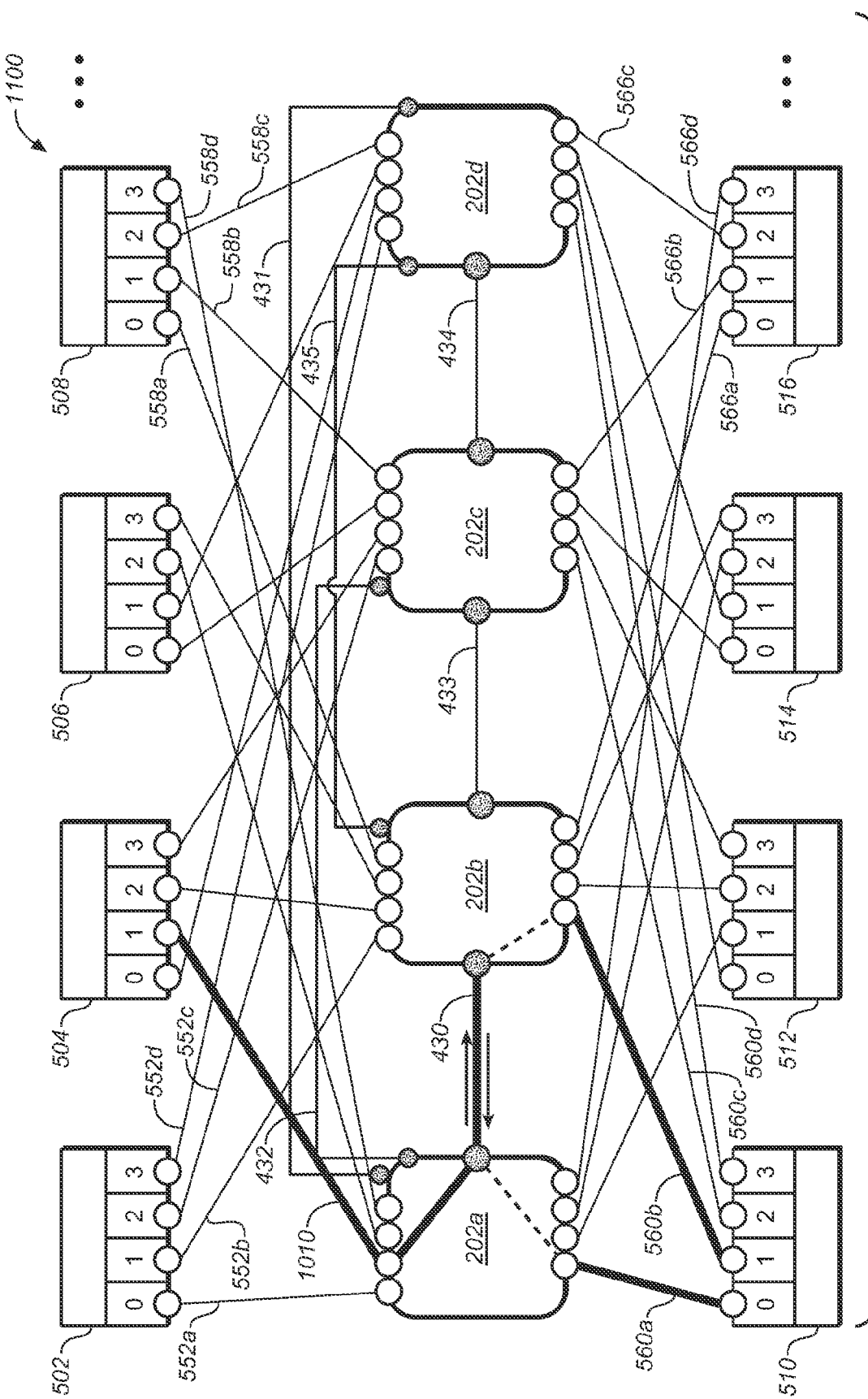
FIG. 11A is a block diagram illustrating a method for back-off retry.

Referring generally to FIG. 11A, the single, cohesive SAS expander 1100 may be configured to provide back-off retry when a link within the single, cohesive expander 1100 fails or is busy. As previously described herein, the input ports 502-508 may be connected to each of the SAS expanders 202a . . . d via links 552a . . . d-558a . . . d. Further, input ports 502-508 may be SAS wide ports. Output ports 510-516 may be connected to each SAS expanders 202a . . . d via links 560a . . . d-566a . . . d. Further, output ports 510-516 may be SAS wide ports. Moreover, each of SAS expanders 202a . . . d may be connected to each other via SAS expander ports for inter-expander communications.

It is recognized that the data transfer re-routing from a first SAS expander 202a to an additional SAS expander (e.g., 202b, 202c or 202d) via the IEL paths 430 . . . 435 described previously herein may result in a routing lock on the additional expander used for re-routing. For example, upon determining a failed 560a link (e.g., logical failure or physical failure) to the output port 510, the data transfer intended to be transmitted via link 560a may be re-routed from the first SAS expander 202a to a second SAS expander 202b via the IEL path 430, which couples the phys for inter-expander communications of the first SAS expander 202a and the phys for the inter-expander communications of the second expander 202b. Provided the second SAS expander 202b has available phys to re-route the data transfer and establish a link to another phys of the original destination output port 510, the data transfer may successfully be re-routed to the original destination output port 510. However, in the event the second SAS expander 202b does not have available phys to complete the re-routing of the data transfer to the original destination output port 510, the single, cohesive expander 1000 may experience phy blocking as the re-routing process locks the connection to the second SAS expander 202b and the data transfer cannot be completed until the second expander 202b obtains available phys to establish the link to the output port 510.

As illustrated in FIG. 11A, a back-off retry process may be implemented to limit the phy blocking described above. For example, upon determining a failed 560a link to the output port 510, the data transfer intended to be transmitted via link 560a may be re-routed from the first SAS expander 202a to a second SAS expander 202b via the IEL path 430, which couples the phys for inter-expander communications of the first SAS expander 202a and the phys for the inter-expander communications of the second expander 202b.

In the event the second SAS expander 202b does not have available phys to complete the re-routing of the data transfer to the original destination output port 510, the data transfer may be re-routed back to the first SAS expander 202a or the data transfer may be retried on the second expander 202b in the event a functional link between 202b and output port 510 becomes available. The first connection to complete on either the first expander 202a or the second expander 202b will be used to complete the connection to the destination output port 510. It is further recognized that attempts to re-route the data transfer back to the first SAS expander 202a or retry the data transfer on the second SAS expander 202b may be repeated until a phy suitable for completing the data transfer to the output port 510 becomes available or the process times out. As a result, no re-route locking occurs on the second expander 202b.

It is further recognized that the back-off retry process may be extended to more than two SAS expanders of the single, cohesive expander 1100. For example, upon determining the second expander 202b cannot complete the connection to the output port 510, the data transfer may be re-routed to a third SAS expander (e.g., third SAS expander 202c or fourth SAS expander 202d), in addition to the re-routing of the data transfer back to the first SAS expander 202a above.

In a further aspect, the second SAS expander 202b (i.e., the IEL receiving SAS expander) may reject the OPEN request re-routed from the first SAS expander 202a (i.e., the sending SAS expander) to the second SAS expander 202b when it does not have available phys to complete the connection. Moreover, the second SAS expander 202b may indicate the presence of phy blocking by sending a vendor unique status "SAS PRIMITIVE" back to the first SAS expander 202a. Upon receiving the blocked connection SAS PRIMITIVE status, the first expander 202a may re-route the connection to another connection (e.g., first SAS expander 202a or a third SAS expander, such as 202c or 202d) or retry the connection on the second SAS expander 202b. This process may be repeated until a phy on one of the expanders becomes available, allowing the first connection to complete on either of the expanders to be used to complete the connection to the destination output port 510.

Figure 11B:
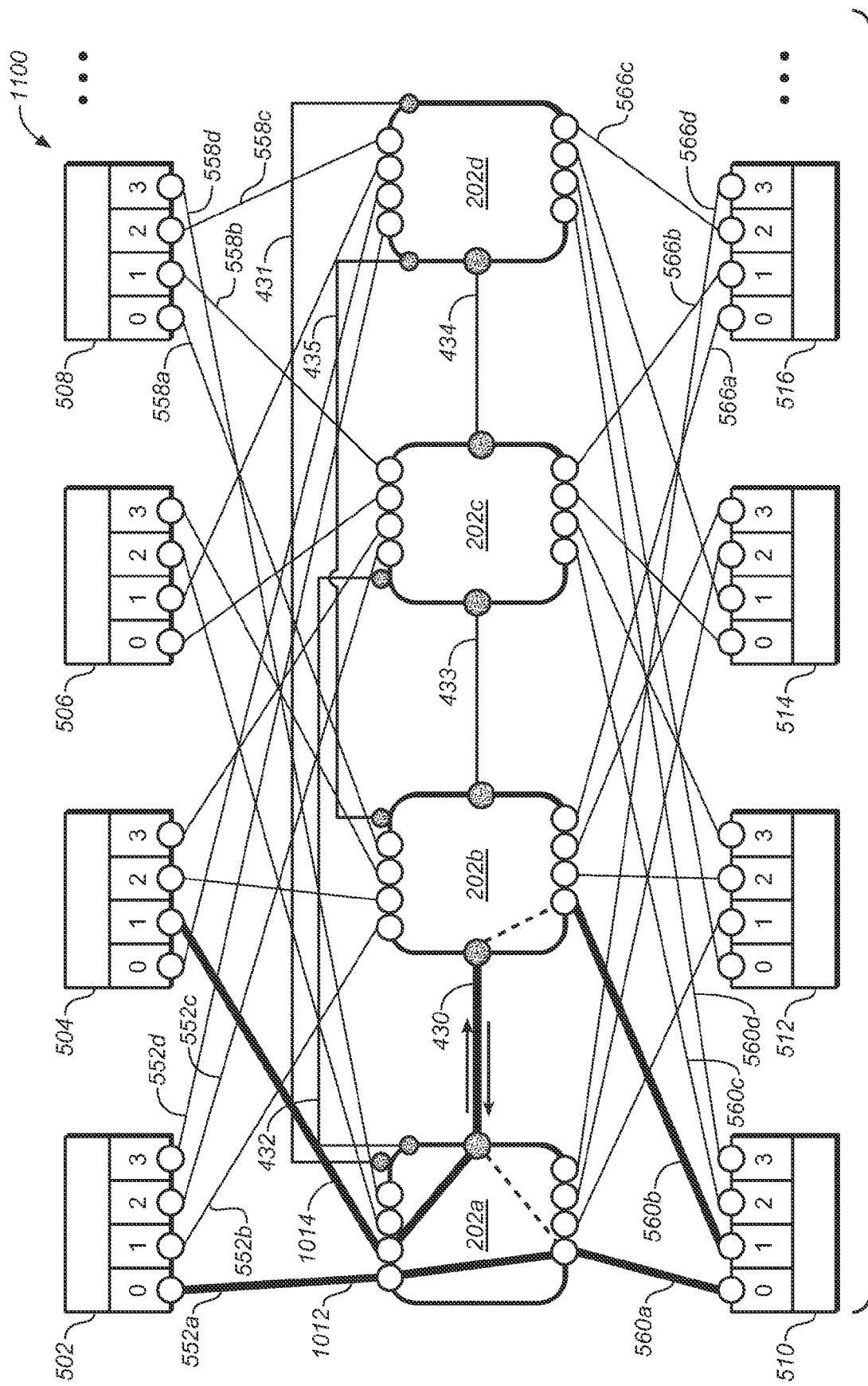
FIG. 11B is a block diagram illustrating a method for back-off retry with priority routing.
Figure 11C:
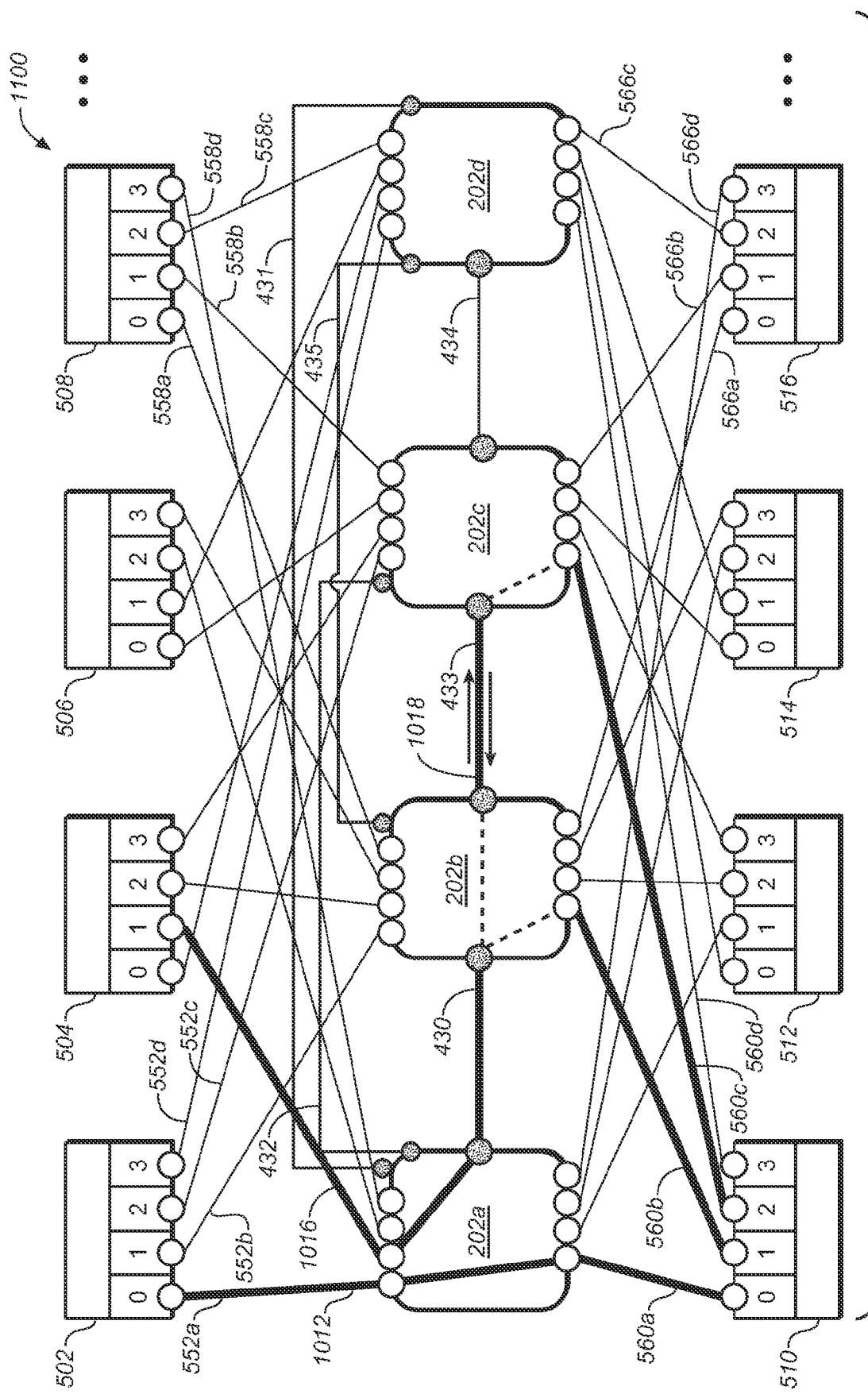
FIG. 11C is a block diagram illustrating a method for back-off retry with priority routing.

Referring generally to FIGS. 11B and 11C, the single, cohesive SAS expander 1100 may be configured to provide back-off retry with priority routing in order to limit or eliminate phy blocking in the single, cohesive expander 1100. As previously described herein, the single, cohesive expander 1100 may provide a priority routing scheme wherein a first OPEN request is always routed on a direct path 1012 through an expander, and a second OPEN request is routed along an alternate path 1014 from a first expander 202a to a second expander 202b via an IEL path 430. It is contemplated herein, as shown in FIG. 11B, that the priority scheme may be combined with the back-off retry process in order to provide simultaneous priority routing with back-off retry.

In one embodiment, a first OPEN request by an initiator on input port 502 may be routed on a direct path 1012 by a first expander 202a to the destination output port 510. Moreover, a second OPEN by an initiator on input port 504 may be routed by the first expander 202a on an alternate path 1014 via the IEL 430 to the second expander 202b. In the event the second expander 202b does not have available phy to complete the connection to the original destination output port 510, a back-off retry process may be implemented. For example, upon determining link 560b connecting the second expander 202b to the output port 510 has failed, the data transfer intended to be transmitted via link 560b may be re-routed from the second SAS expander 202a back to the first SAS expander 202a or the data transfer may be retried on the second expander 202b. Again, as illustrated by the pair of arrows on IEL 430, the first connection to complete on either the first expander 202a or the second expander 202b will be used to complete the connection to the destination output port 510.

In another embodiment, illustrated in FIG. 11C, the back-off retry with priority routing process described above may be extended generally to include more than two SAS expanders. Similarly to the embodiment described above, a first OPEN request by an initiator on input port 502 may be routed on a direct path 1012 by a first expander 202a to the destination output port 510, while a second OPEN request by an initiator on input port 504 may be routed by the first expander 202 on an alternate path 1016 via the IEL 430 to the second expander 202b. Upon determining the link 560b connecting the second expander 202b to the output port 510 has failed or is busy, the data transfer intended to be transmitted via link 560b may be re-routed from the second SAS expander 202b back to the first SAS expander 202a or to a third SAS expander (e.g., expander 202c or expander 202d), or the data transfer may be retried on the second expander 202b until a connection is completed. In the case of the third SAS expander 202c, the data transfer intended to be transmitted via link 560b may be re-routed from the second SAS expander 202b to the third SAS expander 202c, as illustrated by path 1018, or retried on the second SAS expander 202b until a connection is completed. As illustrated by the pair of arrows on IEL 433, the first connection to complete on either the second expander 202b or the third expander 202b will be used to complete the connection to the destination output port 510. In accordance with FIG. 11c, it should be recognized that the data transfer may be successively re-routed to all available SAS expanders connected to the second SAS expander 202b or retried on expander 202b repeatedly until a connection may be completed to output port 510.

Figure 12:
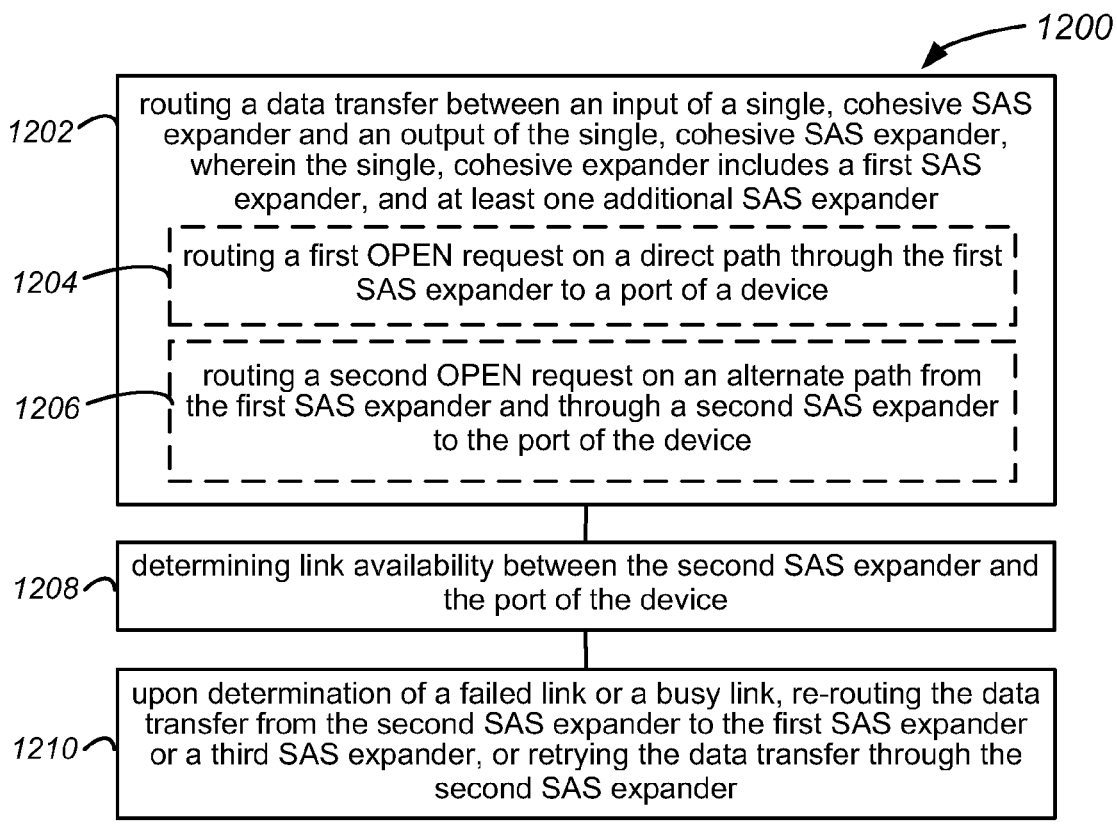
FIG. 12 is a flow diagram illustrating a method for back-off retry with priority routing in a single, cohesive SAS expander system.

Referring generally to FIG. 12, a method 1200 for back-off retry with priority routing in a single, cohesive SAS expander is illustrated in accordance with the present disclosure. In a first step 1202, the method 1200 for back-off retry in a single, cohesive SAS expander 1100 includes routing a data transfer between an input (e.g., input ports 502 . . . 508) of a single, cohesive SAS expander 1100 and an output (e.g., output ports 510 . . . 516) of the single, cohesive SAS expander 1100. The single, cohesive expander 1100 includes a first SAS expander 202a, and at least one additional SAS expander (e.g., 202b . . . 202d), wherein the first SAS expander 202a is connected to the at least one additional SAS expander via at least one inter-expander link (IEL) (e.g. 430 . . . 435).

The routing step 1202 further includes an additional second step 1204. The second step 1204 includes routing a first OPEN request on a direct path 1012 through the first SAS expander 202a to a port (e.g., output port 510) of the device. For example, a first OPEN request by an initiator on input port 502 may be routed by a first expander 202a on a direct path 1012 to an output port 510 of a device.

In addition, the routing step 1202 further includes a third step 1206. The third step 1206 includes routing a second OPEN request on an alternate path (e.g., 1014 or 1016) from the first SAS expander 202a and through a second SAS expander 202b to the port (e.g., output port 510) of the device. For example, a second OPEN request by an initiator on input port 504 may be routed by the first expander 202a on an alternate path (e.g., 1014 or 1016) via the IEL path 430 connecting the first expander 202a and a second expander 202b.

In a fourth step 1208, the method 1200 for back-off retry in a single, cohesive SAS expander 1100 includes determining link availability between the second SAS expander and the port of the device. For example, the second SAS expander 202b may indicate phy blocking by sending a vendor unique status "SAS PRIMITIVE" back to the first SAS expander 202a. Then, the first SAS expander 202a may receive the SAS PRIMITIVE status from the second SAS expander 202b.

In a fifth step 1210, the method 1200 for back-off retry in a single, cohesive SAS expander 1100 includes, upon determination of a failed link or a busy link, re-routing the data transfer from the second SAS expander 202b to the first SAS expander 202a or a third SAS expander (e.g., 202c or 202d), or retrying the data transfer through the second SAS expander 202b. For example, upon receiving the blocked connection SAS PRIMITIVE status from the second expander 202b, the first SAS expander 202b may re-route the data transfer to another SAS expander (e.g., first SAS expander 202a or a third SAS expander, such as 202c or 202d). This process may be repeated until a phy on one of the SAS expanders becomes available, allowing the first connection to complete on any of the expanders to be used to complete the connection to the output port 510.

Figure 13:
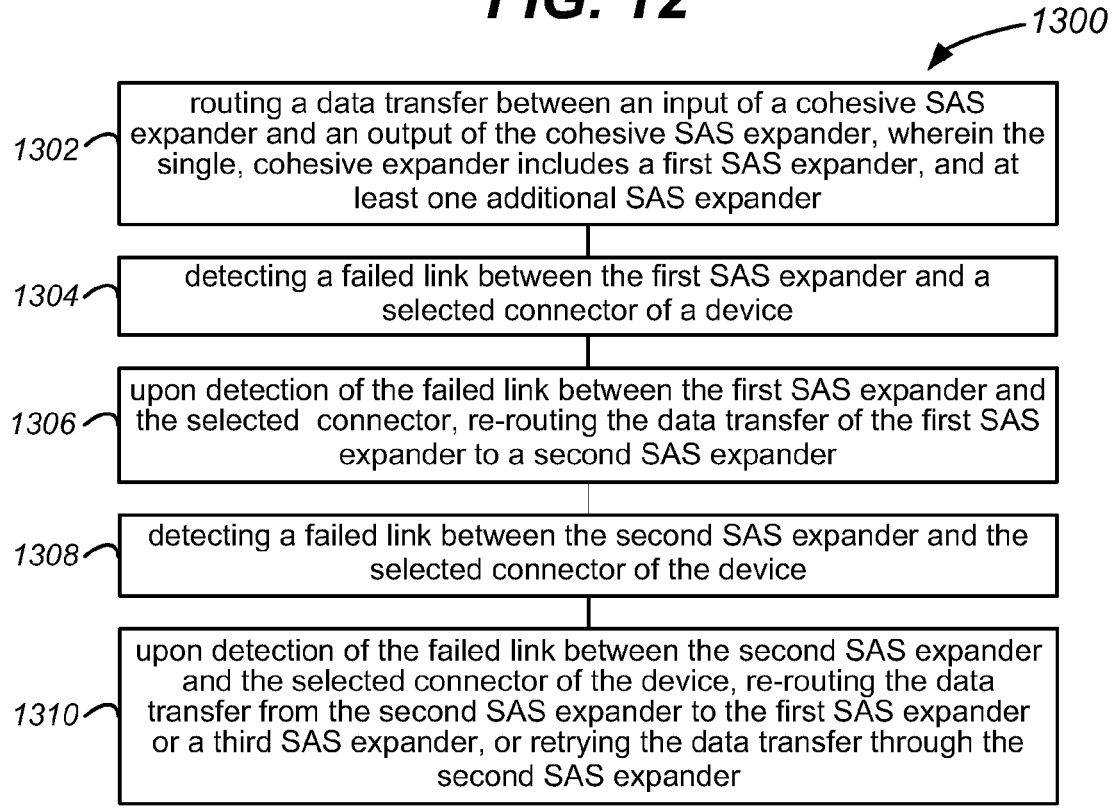
FIG. 13 is a flow diagram illustrating a method for back-off retry in a single, cohesive SAS expander system.

Referring generally to FIG. 13, a method 1300 for back-off retry in a single, cohesive SAS expander is illustrated in accordance with the present disclosure. In a first step 1302, the method 1300 for back-off retry in a single, cohesive SAS expander 1100 includes routing a data transfer between an input (e.g., input ports 502 . . . 508) of a single, cohesive SAS expander and an output (e.g., output ports 510 . . . 516) of the single, cohesive SAS expander. The single, cohesive expander 1100 includes a first SAS expander 202a, and at least one additional SAS expander (e.g., 202b, 202c, or 202d), wherein the first SAS expander is connected to the at least one additional SAS expander via at least one inter-expander link (IEL) (e.g., 430 . . . 435).

In a second step 1304, the method 1300 for back-off retry includes determining link availability between the first SAS expander 202a and a port (e.g., output port 510 . . . 516) of a device. For example, a link may become unavailable because it has failed or is busy due to a physical or logical malfunction between the SAS expander 202a and an intended destination output port 510 . . . 516.

In a third step 1306, the method 1300 for back-off retry includes, upon determination of a failed link or a busy link between the first SAS expander and the port of the device, re-routing the data transfer of the first SAS expander 202a to a second SAS expander 202b. For example, the data transfer may be re-routed from the first SAS expander 202a to a second SAS expander 202b via an IEL path connecting at least one phy for the first SAS expander for inter-expander communications to at least one phys of the second SAS expander for inter-expander communications.

In a fourth step 1308, the method 1300 for back-off retry includes determining link availability between the second SAS expander 202b and the port (e.g., output port 510) of the device. As previously described above, the second SAS expander 202b may indicate phy blocking by sending a vendor unique status "SAS PRIMITIVE" back to the first SAS expander 202a. Then, the first SAS expander 202a may receive the SAS PRIMITIVE status from the second SAS expander 202b.

In a fifth step 1310, the method 1300 for back-off retry includes, upon determination of a failed link or a busy link between the second SAS expander and the port of the device, re-routing the data transfer from the second SAS expander 202b to the first SAS expander 202a or to a third SAS expander (e.g., 202c or 202d), or retrying the data transfer through the second SAS expander 202b. For example, upon receiving the blocked connection SAS PRIMITIVE status from the second expander 202b, the first SAS expander 202b may re-route the data transfer to another SAS expander (e.g., first SAS expander 202a or a third SAS expander, such as 202c or 202d). This process may be repeated until a phy on one of the SAS expanders becomes available, allowing the first connection to complete on either of the expanders to be used to complete the connection to the destination port (e.g., output port 510).

In the present disclosure, the methods disclosed may be implemented as sets of instructions or software readable by a device. Such software may a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for back-off retry in a single, cohesive serial attached small computer system interface (SAS) expander, comprising:

routing a data transfer between an input of a single, cohesive SAS expander and an output of the single, cohesive SAS expander, wherein the single, cohesive expander includes a first SAS expander, and at least one additional SAS expander, wherein the first SAS expander is connected to the at least one additional SAS expander via at least one inter-expander link (IEL) for inter-expander communications, wherein the routing the data transfer further includes:
routing a first OPEN request on a direct path through the first SAS expander to a port of a device; and
routing a second OPEN request on an indirect alternate path from the first SAS expander and through a second SAS expander to the port of the device, the indirect alternate path established via an IEL connecting at least one phys of the first SAS expander for inter-expander communications to at least one phys of the second SAS expander for inter-expander communications;

determining link availability between the second SAS expander and the port of the device; and upon determining the link availability between the second SAS expander and the port of the device to be a failed link or a busy link:
re-routing the data transfer from the second SAS expander to the first SAS expander when the first SAS expander is available;
re-routing the data transfer from the second SAS expander to the third SAS expander when first SAS expander is not available; and
retrying the data transfer through the second SAS expander when the first SAS expander and third SAS expander is not available.

2. The method of claim 1, wherein the IEL between the first SAS expander and the at least one additional SAS expander connects the first SAS expander to the at least one additional SAS expander via at least one phy for inter-expander communications of the first SAS expander and at least one phy for inter-expander communications of the at least one additional SAS expander.

3. The method of claim 1, further comprising:
sending a vendor unique status SAS PRIMITIVE from the second SAS expander to the first SAS expander upon determination that the second SAS is unable to complete the data transfer to the port of the device.

4. The method of claim 1, wherein the determining link availability between the second SAS expander and the port of the device comprises:
receiving an SAS PRIMITIVE status sent by the second SAS expander, the SAS PRIMITIVE status received by the first SAS expander.

5. The method of claim 1, wherein at least one of the failed link or the busy link results from at least one of a physical malfunction or a logical malfunction.

6. The method of claim 1, wherein the re-routing the data transfer from the second SAS expander to the first SAS expander or a third SAS expander comprises:
re-routing the data transfer from the second SAS expander to the first SAS expander via an IEL path connecting at least one phys of the first SAS expander for inter-expander communications to at least one phys of the second SAS expander for inter-expander communications or re-routing the data transfer from the second SAS expander to a third SAS expander via an IEL path connecting at least one phys of the second SAS expander for inter-expander communications to at least one phys of the third SAS expander for inter-expander communications.

7. The method of claim 1, wherein the retrying the data transfer through the second SAS expander comprises:
retrying the data transfer through the second SAS expander via a functional link between the second SAS expander and the port of the device.

8. The method of claim 1, wherein the inter-expander communications utilize a SAS Management Protocol.

9. The method of claim 1, wherein the first SAS expander and the at least one additional SAS expander each implement firmware configured to operate the first SAS expander and the at least one additional SAS expander as a single, cohesive expander.

10. The method of claim 1, wherein the port of the device comprises:
a wide port of the device.

11. The method of claim 1, wherein the re-routing the data transfer from the second SAS expander to the first SAS expander or a third SAS expander, or retrying the data transfer through the second SAS expander comprises:
repeatedly attempting to re-route the data transfer from the second SAS expander to the first SAS expander or to a third SAS expander or retrying the data transfer through the second SAS expander until a phy suitable for completing the data transfer to the port of the device becomes available.

12. The method of claim 1, wherein the re-routing the data transfer from the second SAS expander to the first SAS expander or a third SAS expander, or retrying the data transfer through the second SAS expander comprises:
repeatedly attempting to re-route the data transfer from the second SAS expander to the first SAS expander or to a third SAS expander or retrying the data transfer through the second SAS expander until a timeout occurs.

13. A method for back-off retry in a single, cohesive serial attached small computer system interface (SAS) expander, comprising:
routing a data transfer between an input of a single, cohesive SAS expander and an output of the single, cohesive SAS expander, wherein the single, cohesive expander includes a first SAS expander, and at least one additional SAS expander, wherein the first SAS expander is connected to the at least one additional SAS expander via at least one inter-expander link (IEL) for inter-expander communications;
determining link availability between the first SAS expander and a port of a device;
upon determination of a failed link or a busy link between the first SAS expander and the port of the device, re-routing the data transfer of the first SAS expander to a second SAS expander on an indirect alternate path via an IEL path connecting at least one phys of the first SAS expander for inter-expander communications to at least one phys of the second SAS expander for inter-expander communications;
determining link availability between the second SAS expander and the port of the device; and
upon determining the link availability between the second SAS expander and the port of the device to be a failed link or a busy link:
re-routing the data transfer from the second SAS expander to the first SAS expander when the first SAS expander is available;
re-routing the data transfer from the second SAS expander to the third SAS expander when first SAS expander is not available; and
retrying the data transfer through the second SAS expander when the first SAS expander and third SAS expander is not available.

14. The method of claim 13, wherein the IEL between the first SAS expander and the at least one additional SAS expander connects the first SAS expander to the at least one additional SAS expander via at least one phy for inter-expander communications of the first SAS expander and at least one phy for inter-expander communications of the at least one additional SAS expander.

15. The method of claim 13, further comprising:
sending a vendor unique status SAS PRIMITIVE from the second SAS expander to the first SAS expander upon determination that the second SAS is unable to complete the data transfer to the selected connector of the device.

16. The method of claim 13, wherein the determining link availability between the second SAS expander and the port of the device comprises:
receiving an SAS PRIMITIVE status sent by the second SAS expander, the SAS PRIMITIVE status received by the first SAS expander.

17. The method of claim 13, wherein the re-routing the data transfer from the second SAS expander to the first SAS expander or a third SAS expander comprises:
re-routing the data transfer from the second SAS expander to the first SAS expander via an IEL path connecting at least one phys of the first SAS expander for inter-expander communications to at least one phys of the second SAS expander for inter-expander communications or re-routing the data transfer from the second SAS expander to a third SAS expander via an IEL path connecting at least one phys of the second SAS expander for inter-expander communications to at least one phys of the third SAS expander for inter-expander communications.

18. The method of claim 13, wherein the retrying the data transfer through the second SAS expander comprises:
retrying the data transfer through the second SAS expander via a functional link between the second SAS expander and the port of the device.

19. The method of claim 13, wherein the port of the device comprises:
a wide port of the device.

20. The method of claim 13, wherein the re-routing the data transfer from the second SAS expander to the first SAS expander or a third SAS expander, or retrying the data transfer through the second SAS expander comprises:
repeatedly attempting to re-route the data transfer from the second SAS expander to the first SAS expander or to a third SAS expander or retrying the data transfer through the second SAS expander until a phy suitable for completing the data transfer to the selected connector of the device becomes available.

21. The method of claim 13, wherein the re-routing the data transfer from the second SAS expander to the first SAS expander or a third SAS expander, or retrying the data transfer through the second SAS expander comprises:
repeatedly attempting to re-route the data transfer from the second SAS expander to the first SAS expander or to a third SAS expander or retrying the data transfer through the second SAS expander until a timeout occurs.

* * * * *